United States Patent [19]

Davis et al.

[11] Patent Number: 5,537,813
[45] Date of Patent: Jul. 23, 1996

[54] GAS TURBINE INLET AIR COMBINED PRESSURE BOOST AND COOLING METHOD AND APPARATUS

[75] Inventors: Thomas L. Davis; John P. Shell, both of Raleigh; Todd W. Beadle, Wilkesboro; Keith S. McAllister, Raleigh; Alexander O. Hobbs, Cary, all of N.C.

[73] Assignee: Carolina Power & Light Company, Raleigh, N.C.

[21] Appl. No.: 399,534

[22] Filed: Mar. 7, 1995

Related U.S. Application Data

[63] Continuation-in-part of Ser. No. 121,059, Sep. 14, 1993, abandoned, which is a continuation-in-part of Ser. No. 987,197, Dec. 8, 1992, abandoned.

[51] Int. Cl.$^6$ ....................................... F02G 3/00
[52] U.S. Cl. ................... 60/39.05; 60/39.53; 60/39.59; 60/728; 60/726; 417/150; 417/151; 417/179
[58] Field of Search ............................. 60/39.05, 39.53, 60/39.58, 39.59, 726, 728; 417/150, 179, 77, 87, 151

[56] References Cited

U.S. PATENT DOCUMENTS

| Re. 32,669 | 5/1988 | Angle | 417/151 |
|---|---|---|---|
| 118,472 | 8/1871 | Munzinger | 417/77 |
| 1,151,259 | 8/1915 | Fischer | 417/179 |
| 2,382,421 | 8/1945 | Johnson et al. | 417/150 |
| 2,861,737 | 11/1958 | Bowen | 230/105 |
| 2,974,482 | 3/1961 | Kelley | 60/39.05 |
| 3,107,657 | 10/1963 | Cook | 60/39.53 |
| 3,796,045 | 3/1974 | Foster-Pegg | 60/39.02 |
| 4,149,828 | 4/1979 | Affri | 417/179 |
| 4,307,299 | 12/1981 | Norton | 60/398 |
| 4,426,842 | 1/1984 | Collet | 60/728 |
| 4,462,205 | 7/1984 | Giles et al. | 60/39.02 |
| 5,099,648 | 3/1992 | Angle | 62/726 |
| 5,203,161 | 4/1993 | Lehto | 60/39.53 |
| 5,353,585 | 10/1994 | Munk | 60/728 |

FOREIGN PATENT DOCUMENTS

| 50300 | 5/1981 | Japan | 417/77 |
|---|---|---|---|

OTHER PUBLICATIONS

"Peaking Gas Turbine Capacity Enhancement Using Ice Storage for Compressor Inlet Air Cooling," ASME 92-GT-265, Jun. 1992.

*Primary Examiner*—Timothy S. Thorpe
*Assistant Examiner*—Ted Kim
*Attorney, Agent, or Firm*—Richard S. Faust

[57] ABSTRACT

The operational capacity and efficiency of a combustion turbine is increased by treating the turbine inlet air to increase its density. The inlet air treatment is achieved in a columnar tower with the inlet air being drawn in at the top of the tower. Treatment water is injected into the tower at a downward velocity greater than that of the inlet air to establish a vertically descending, two-phase co-current flow of inlet air and treatment water. The system utilizes the natural phenomenon of drag-induced pressure boost to the air achieved by the difference in the relative velocities of the inlet air and the treatment water in the co-current flow. By utilizing a cold treatment water, for example at 32°–40° F., the tower creates a direct contact heat transfer situation that cools the inlet air, thereby further increasing its density. The invention serves to increase the operational capacity and efficiency of existing or new peaking combustion turbines at a cost per kW that is substantially less than that of installing new peaking combustion turbine capacity, while also permitting enhanced load following capabilities for the electric utility's control center.

37 Claims, 11 Drawing Sheets

| INLET AIR TEMPERATURE | SPECIFIC VOLUME | MW OUTPUT |
|---|---|---|
| 95°F | 14.3 FT³/# | 52 MW |
| 60°F | 13.2 FT³/# | 64 MW |
| 10°F | 11.8 FT³/# | 80 MW |

|   | FINAL VOLUME FT$^3$/LBM | IDEAL WORK BTU/LBM | IDEAL COOLING BTU/LBM |
|---|---|---|---|
| 1 ISOBARIC COOLING | 12.7 | 0 | 24.5 |
| 2 COOLING/ISOTHERMAL COMPRESSION | 11.5 | 3.34 | 28.4 |
| 3 ISENTROPIC COMPRESSION | 11.5 | 12.39 | 0 |
| 4 COOLING/ISENTROPIC COMPRESSION | 11.5 | 4.88 | 24.5 |
| 5 ISENTROPIC COMPRESSION/COOLING | 11.5 | 4.44 | 28.9 |

GAS TURBINE INLET AIR COMBINED PRESSURE BOOST AND COOLING METHOD AND APPARATUS

CROSS REFERENCE TO RELATED APPLICATIONS

This is a continuation-in-part of U.S. patent application Ser. No. 08/121,059, now abandoned filed Sep. 14, 1993 which is, in turn, a continuation-in-part of Ser. No. 07/987,197, filed Dec. 8, 1992, now abandoned.

FIELD OF INVENTION

This invention relates to the generation of electrical power by combustion turbines. More particularly, the invention relates to increasing the operational capacity and efficiency of combustion turbines by treating the turbine inlet air.

BACKGROUND OF THE INVENTION

Electric utilities employ nuclear plants, hydroelectric plants, fossil fuel steam generation plants, and the like, to meet their base load requirements, i.e., to provide the bulk of the power that is produced to meet the day-to-day power demands of their customers. However, electric utilities also must have the capability of meeting peaking demands, e.g., for summer peaking utilities, the demand created during the hottest part of summer days. Also, electric utilities that participate in so-called "power pools" must meet reserve capacity requirements under which the utility must be able to bring a prescribed amount of additional capacity on line rapidly, for example, within ten minutes of notification. Thus, to meet peaking demands and power pool reserve capacity requirements, electric utilities need to have on hand fast starting, peaking generators, often powered by gas turbines.

Any process or mechanism that will increase the capacity of existing peaking gas turbines at a cost less than that of new turbines will have a significant impact on the cost assumed by electric utilities in meeting their peak demand and power pool capacity credit requirements. One such approach has been to treat the turbine inlet air, as explained in the text below.

The above-mentioned fast starting, peaking combustion turbine systems (utilizing natural gas or fuel oil) operate under the Brayton cycle wherein the inlet air is compressed in a compressor, heated in a combustor and expanded in a turbine whose shaft drives a generator. Throughout this specification when either the term "turbine" or the term "turbine system" is used alone, it will usually refer generally to the entire combustion turbine system including a compressor, combustor and turbine generator rather than the specific expansion turbine component of the system.

It is well known that combustion turbines driving grid synchronized generators operate at constant speed and are essentially "constant volume machines"; i.e., they operate at a fixed volume flow rate of inlet air. It is also known that the generation capacity of a combustion turbine system is roughly proportional to the mass flow rate of the inlet air to the combustion turbine system. Thus, at high ambient atmospheric temperature, the inlet air is less dense resulting in lower generator capacity. A cruel irony is that for many electric utilities, particularly summer peaking utilities, peak demand occurs during the hottest weather conditions when the operational capacity and efficiency of the turbines are at their lowest due to the relatively low density of the inlet air.

Thus, utilities that experience peak load during summer months can increase their peak generating capacity by cooling inlet air for combustion turbines if such cooling can be done at a cost less than the construction of additional turbines.

Attempts have been made to cool the inlet air on hot days prior to introducing the air to the turbine system. These cooling methods include evaporative cooling, direct acting cooling and, most recently, the use of cooling water from an ice harvesting system in conjunction with a hydronic coil heat exchanger. Evaporative cooling is limited to the local wet bulb and hydronic coils using water from ice storage have practical design limits of about 40° F. unless brines or antifreeze solutions are used. However, regardless of the cooling mechanism employed, there appears to be a practical lower temperature limit ("icing" limit) specific to the compressor design to which the inlet air may be cooled without dehumidification. This limit exists because the inlet air contains moisture which will actually freeze on the inlet guide vanes and other metal surfaces at inlet air temperatures below this practical lower temperature limit. In theory, this freezing occurs because as the air entering the compressor accelerates to a velocity on the order of 0.5 Mach, the static temperature of the inlet air is depressed to a freezing level. Thus, the density boost and resulting operating advantages to be achieved by just cooling the inlet air appear to be limited.

The density of the inlet air also has been increased by supercharging the air utilizing fans and/or blowers to compress the air by some amount, e.g., up to about 160" $H_2O$. However, this approach is also limited in its application because its power consumption is parasitic to the turbine thereby reducing net output.

It has also been proposed in U.S. Pat. No. 3,796,045 to combine the cooling and supercharging approaches mentioned above to achieve a so-called "superchilling" of the inlet air for base load gas turbine systems. The inlet air is first supercharged with a fan or blower to compress the inlet air to a pressure level moderately greater than the atmospheric pressure and thereafter chilled by use of a waste heat recovery, combined cycle system powering a refrigeration cycle.

Finally, in a somewhat related area, the prior art proposes massive hydraulic compression systems, as exemplified by the disclosure of U.S. Pat. No. 5,099,648, which provide the entire compression of the inlet air prior to its heating by the combustor, thereby eliminating the mechanical compressor altogether. These systems utilize entrained air within water columns that descend to tremendous depths, e.g., 1,000 feet, in order to achieve a pressure boost on the order of 10 atmospheres. While these proposals deal with combustion turbines, they are fundamentally different in mechanism and are not applicable to inlet density boost for peaking combustion turbines.

Thus, there continues to be an acute need in the electric utility industry for a practical, commercially sensible way to dramatically lower costs associated with the provision of peaking capacity. While one approach is simply to build and install more and more gas turbines, the approach of improving gas turbine operational capacity and efficiency, particularly in hot weather conditions, appears to offer the best hope for substantial monetary savings at the margin. Any such system needs to be reliable over a long-term operating life and provide a significant increase in capacity at a fraction of the cost of new gas turbines. Furthermore, and importantly, any such system should not have a negative impact on the fast starting capability of the gas turbine. In fact, enhancing fast starting capability is desirable. Additionally, if possible, the system should provide other operational advantages, for example, enhanced load following capabilities that could be achieved by higher turn down ratios and better means to modulate the output of the peaking turbines used by an electric utility.

SUMMARY OF THE INVENTION

In one significant respect, the present invention is predicated upon the recognition of the inherent limits of systems that only cool the inlet air to a peaking combustion turbine. The invention provides a system that offers the capability to compress the inlet air by a fraction of an atmosphere (e.g., a pressure boost of as much as fifty inches $H_2O$) and also, in certain preferred embodiments, cool the inlet air by a significant amount (e.g., to between 32° F. and 60° F.). The combined effect of both compressing and cooling the inlet air achieves a density boost that dramatically increases the operational capacity and efficiency of the gas turbine at an incremental cost significantly below that of installing new gas turbine capacity. This incremental capacity is available exactly when it is needed during hot weather peaking conditions.

The combined compression and cooling of the inlet air is best achieved in a columnar tower structure. The inlet air is drawn in at the top of the tower and moves downwardly through the tower. Cold treatment water is injected at a downward velocity higher than that of the inlet air to create a vertically descending, two-phase co-current flow of inlet air and treatment water. This system utilizes the natural phenomenon of drag-induced pressure boost to the air achieved by injecting the water so that its relative velocity in the co-current flow is greater than that of the inlet air. As the water travels through the descending air, it creates a drag force that is proportional to the square of its velocity relative to the air. Furthermore, the co-current flow creates a direct contact heat transfer situation that serves to cool the inlet air by direct contact of the air to the cooling water, thereby further increasing its density.

In order to achieve a significant pressure boost, the mass flow rate of the treatment water in the column and the velocity of the injected water will exceed that which would be necessary to only cool the air. Thus, typically there are additional water pumping requirements over those that would be necessary for direct contact, co-current cooling alone. However, the increased pumping costs are justified by the significant pressure boost to the inlet air, resulting in further increased density of the inlet air and significantly increased operational capacity and efficiency of the gas turbine, especially in hot weather conditions.

By utilizing stored thermal energy, as opposed to simultaneous, parasitic power to cool the cooling water, the system may utilize off-peak power to effect cooling. One example of a stored energy system is an ice production and ice harvesting system which includes an ice making machine that delivers ice to a flooded thermal storage tank from which cold water is pumped on demand to provide the cooling water for the invention.

In one aspect, the present invention is characterized as a method of increasing the operational capacity and efficiency of a combustion turbine system by treatment of the turbine inlet air prior to its introduction into the compressor of the turbine system. The method comprises establishing a vertically descending flow of inlet air, introducing treatment water into the flow of inlet air at a downward velocity greater than that of the inlet air to create a drag-induced pressure increase in the inlet air, and introducing the treated turbine inlet air into the compressor of the turbine system.

The co-current flow may be achieved advantageously in a tower structure wherein both the inlet air and treatment water are introduced near the top of the tower. However, if desired, the treatment water may be injected at any selected distance above the lower end of the tower, or it may be injected at two or more levels within the tower.

In another aspect, the present invention is characterized as an inlet air treatment system for increasing the operational capacity and efficiency of the combustion turbine. The system includes a tower having an upper end and a lower air discharge end. An air inlet is provided at the upper end of the tower for introducing atmospheric air into the tower for downwardly directed flow therethrough. A source of treatment water supplies injectors that inject treatment water into the tower at a downward velocity greater than that of the inlet air flow in the tower to create a drag-induced pressure increase in the inlet air. Use of a cold or relatively cool treatment water provides cooling of the air as the air and water flow co-currently through the tower, and a further increase in density. A conduit at the lower end of the tower directs the cooled and compressed turbine air to the inlet duct of the compressor of the combustion turbine system. According to this system, the tower may have a cross-sectional shape that is substantially the same over its entire height or, in the alternative, it may have a centrally located constricted area creating a venturi-like flow path for enhancing the pressure increase imparted to the inlet air in the tower.

In yet another aspect, the present invention is characterized as a method of enhancing the load following capabilities of an electric utility having a base load generating capacity and also having peaking combustion turbines available for rapid deployment to modulate the utility's power generation level to match the level required by a power pool or like arrangement. According to this method, the operational capacity and associated turn down ratio of the peaking combustion turbines are expanded by providing the utility's control center with the capability to increase the density of the inlet air to the turbines through cooling and compression of the inlet air in amounts and at times determined necessary by the control center. The expanding of the operational capacity and turn down ratio is achieved by utilizing methods as described above. In situations where the treatment water is derived from an ice harvesting thermal energy storage system, the modulation of the power generation of the utility may be achieved by a combination of inlet air cooling and inlet air drag-induced pressure increase for the peaking combustion turbines to permit a tradeoff between depletion of ice inventory versus pumping power for the treatment water.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
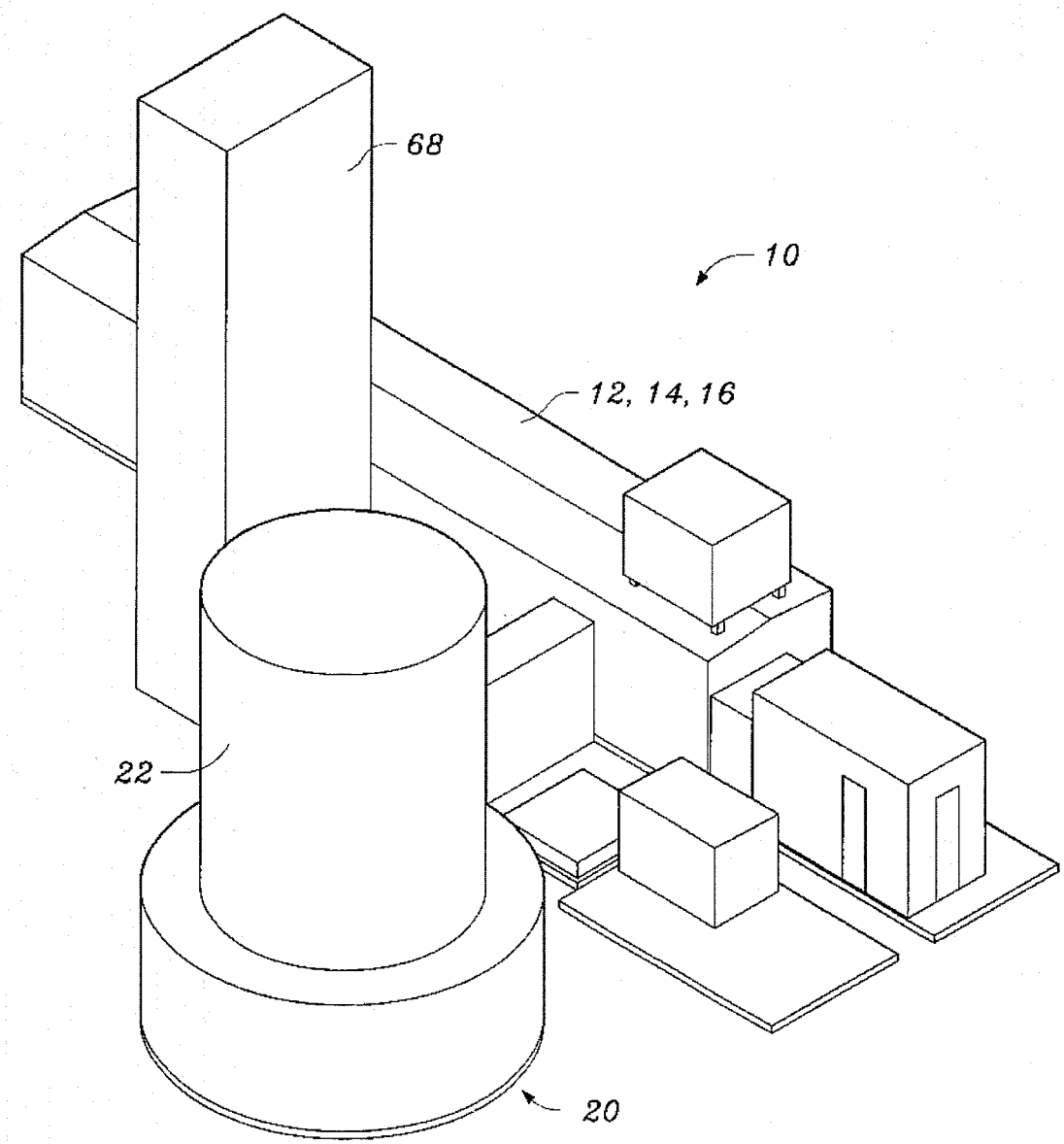
FIG. 1 is a pictorial representation of portions of a conventional gas turbine electric power generation system provided with an inlet air treatment system in accordance with the present invention.
Figure 2:
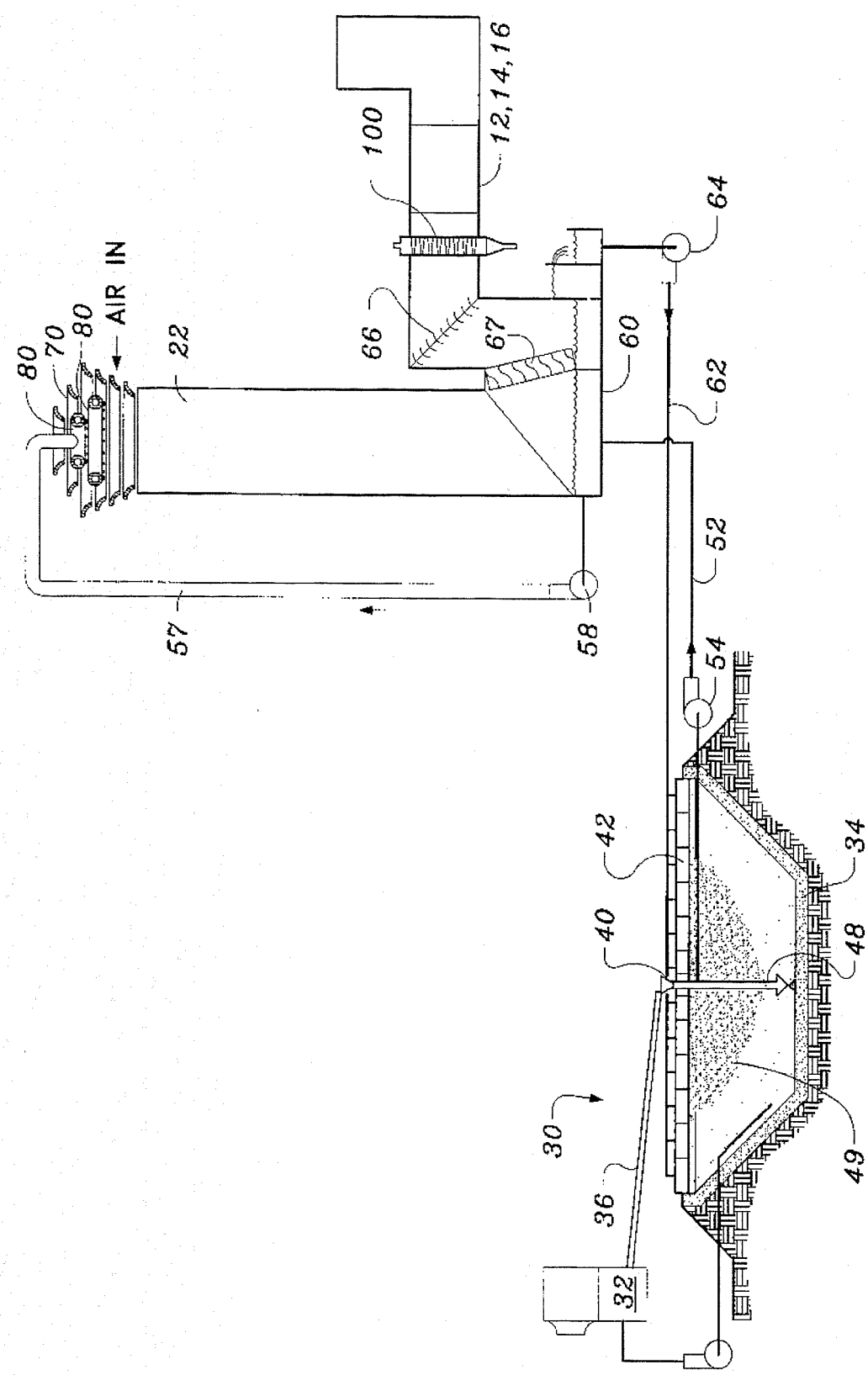
FIG. 2 is a schematic representation of the inlet air treatment system of FIG. 1.

Representative Structural Components of the Invention and General Principles of Operation Referring to the drawings, and particularly to FIGS. 1 and 2, there are shown portions of a gas turbine electric power generation system 10 that operates under a conventional gas turbine cycle wherein inlet air from the atmosphere is compressed in a compressor 12, heated in a combustor 14 and expanded in a turbine 16 which in turn drives an electric generator (not shown).

FIGS. 1 and 2 also show a mechanism for increasing the operational capacity and efficiency of power generation system 10 by treating the inlet air to increase its density. In the illustrated embodiment, the system for increasing the operational capacity and efficiency takes the form of an inlet air treatment system 20 that is best shown schematically in FIG. 2. System 20 provides the capability to both compress and cool the turbine inlet air in a columnar tower 22 that defines an interior, vertical fluid flow passage in which the inlet air and treatment water establish a vertically descending, two-phase co-current flow. It will be appreciated that more than one tower may be used.

In the illustrated embodiment, cold treatment water is provided by an ice production and ice harvesting system generally identified by the reference numeral 30. Ice production takes place in an ice machine 32 which may conveniently include a vapor compression refrigeration system. The ice machine delivers ice to a thermal storage tank 34 by means of an ice conveyance conduit 36. Ice is deposited into a delivery hopper 40 which is secured above the top 42 of tank 34. Ice is delivered through an ice delivery conduit 48 to the bottom of the thermal storage tank which is otherwise flooded with water. The ice forms an agglomerated ice mass 49 in the tank whose thermal energy is used to provide cold treatment water for use in accordance with the present invention. Details of the ice delivery system, thermal storage tank, building and harvesting of the ice mass and the specially designed top of the thermal storage tank may be found by reference to U.S. Pat. Nos. 5,046,551 and 5,063,748 and 5,195,850, the teachings of which are incorporated herein by reference.

The treatment water is delivered from its source, storage tank 34, by means of conduit 52 through pump 54 to a water collection pool 60 at the base of tower 22. A conduit 57 and associated pump 58 serve to deliver the cold water from the collection pool to the top of tower 22. The treatment water is injected downwardly into the tower so that it flows co-currently with the inlet air in the tower to both compress and cool the air, as described in more detail below. The treatment water is collected at the bottom of the tower at 60 and delivered back to the thermal storage tank at desired flow rates by means of conduit 62 and pump 64. Mist eliminators 66 and 67 serve to remove moisture from the treated inlet air flow for capture at 60 and also may serve as turning vanes to assist the flow. The return water, at a somewhat elevated temperature, is returned to tank 34 in such a way as to produce a predictable and symmetrical melt of the ice mass that enables the ice mass to retain its essential shape and buoyant stability.

It will be appreciated that the temperature of the treatment water emanating from the ice harvesting thermal storage system, or other system, may be adjusted prior to injection into tower 22 by control of the temperature in the water collection pool at the base of the towers, or by other means such as a closed-loop system with feedback that serves to mix water to achieve a desired temperature.

The general principles concerning the structure and operation of tower 22 will now be described with primary reference to FIG. 2. At its upper end, tower 22 includes an air inlet which communicates with the atmosphere for introducing atmospheric air into the tower. Preferably the inlet is at an elevation below that of the top of the exhaust stack 68 (FIG. 1) from the turbine system in order to prevent the intake of exhaust gases. The inlet may take the form of annular openings such as those shown at 70. The introduction of the air into tower 22 is facilitated by induction created by the descending water flow. The height of the tower will be chosen to meet system requirements, with heights on the order of five to seventy feet being typical, and with heights on the order of ten to forty feet being most preferred. Tower 22 is shown as having a cylindrical shape, but other shapes may be used. Furthermore, in other embodiments, the piping for carrying treatment water to the top of the tower may be contained in a central pipe encasement, resulting in an annular flow passage within the tower.

Water injectors, shown generally at 80, are located proximate the upper end of tower 22. As discussed above, the purpose of the injectors, in conjunction with the inlet air introduced through openings 70, is to create a vertically descending, two-phase, co-current flow of inlet air and treatment water in tower 22 in order to treat the inlet air. In this regard, the treatment water is injected at a mass flow rate and a downward velocity relative to the flow of inlet air in the tower sufficient to create a desired drag-induced pressure increase to the inlet air as the air and water flow co-currently through the tower. It will be appreciated that in certain embodiments all of the treatment water may be injected through identical nozzles, resulting in all of the water having similar injection properties in terms of velocity, etc. In other embodiments, the treatment water may be injected through nozzles of different configurations, resulting in (i) some of the water having a greater initial velocity than other portions of the water and (ii) some of the water having the tendency to break up (diffuse) into smaller drops at or near the top of the tower while other portions of the water may be injected in the form of jets having collimated jet cores. The jets shed their outer layers as they descend and are designed to break up completely or almost completely into smaller drops by the time they reach relatively near the bottom of the tower.

In those situations as illustrated in FIG. 2 where the treatment water is maintained at a low temperature by utilizing stored thermal energy in an ice storage tank, the inlet air is cooled to a temperature near that of the treatment water, e.g., about 32° F. to 40° F.

In practicing the invention, it is often desirable to select the cross-sectional area of tower 22 to provide an inlet air velocity in the tower that is consistent with accepted air duct design practice. In this regard, typical inlet air velocities are in the range of about fifteen feet per second to about forty feet per second.

It will be appreciated that the drag force on each discrete mass of treatment water (whether in the form of a rainsize water droplet or other configuration) as it co-currently descends through the inlet air is proportional to the square of its velocity relative to the air.

Thermodynamic Principles

Further details of the structure and operational parameters of the invention will be discussed later in the specification, following the discussion of the graphs and charts of FIGS. 3–7 immediately below concerning thermodynamics principles.

Figure 3:
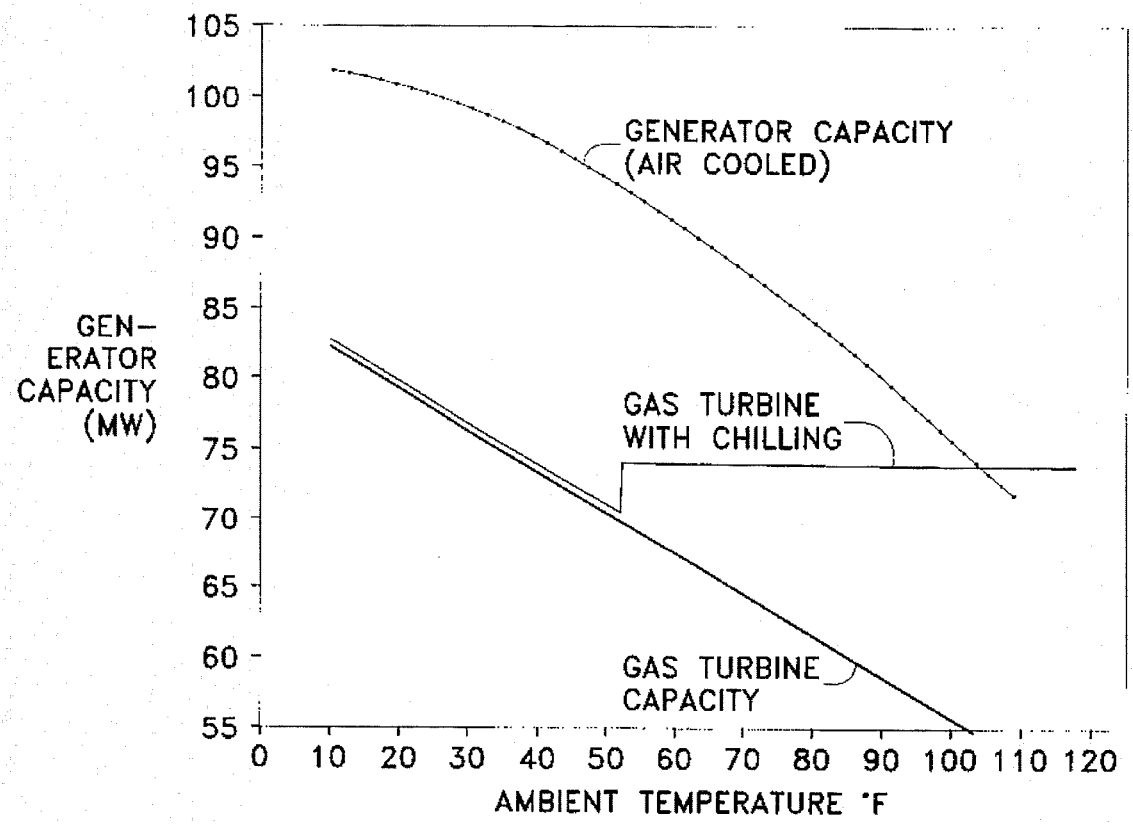
FIG. 3 is a graph showing gas turbine generator capacity as a function of the ambient temperature of the inlet air, for a representative gas turbine generator set.
Figures 4, 5:
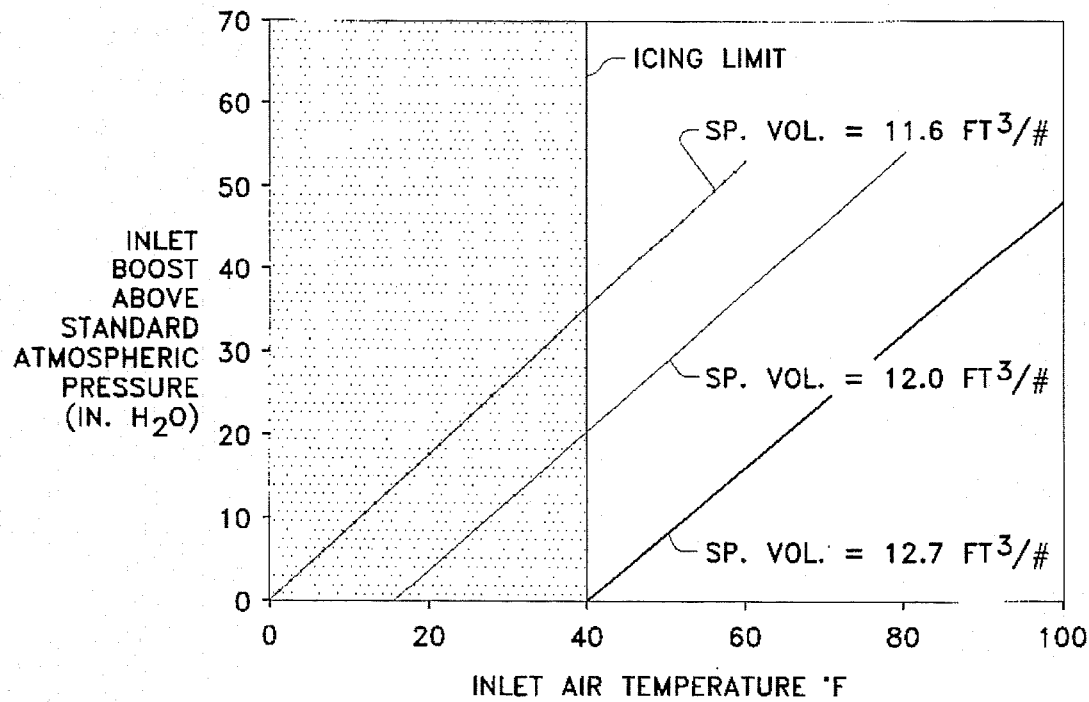
FIG. 4 is a chart showing the relationship between inlet air temperatures (and the associated specific volume of the inlet air) to the MW output for a particular Westinghouse 501 gas turbine system.
FIG. 5 is a graph showing the inlet air pressure boost and temperature cooling effects necessary to achieve three specific volume conditions of 12.7, 12.0 and 11.6 ft$^3$/lb.

The relationship between decreased generator capacity as a function of increased ambient air temperature for a representative peaking gas turbine is illustrated in FIG. 3, showing that the capacity is lowest when it is needed the most—during the hottest part of summer days. FIG. 4 shows the specific volumes (in ft.$^3$/lb.) and outputs (in megawatts) of a typical Westinghouse 501 peaking gas turbine system at inlet temperatures of 10° F., 60° F. and 90° F. without any inlet air treatment to achieve a density boost. As can be readily seen, the effect of inlet air specific volume upon megawatt output is dramatic.

FIG. 5 shows the inlet air pressure boost and temperature cooling effects that are needed to achieve three specific volume values, namely 12.7 ft.$^3$/lb., 12.0 ft.$^3$/lb. and 11.6 ft.$^3$/lb. It will be appreciated that at one theoretical lower temperature limit for the inlet air to a representative peaking gas turbine, say 40° F. the specific volume of the inlet air without a compression boost is 12.7 ft.$^3$/lb. This represents the best specific volume available without a pressure boost, assuming cooling beyond the theoretical icing limit is prohibited. However, at 40° F. and with a pressure boost of approximately 23" H$_2$O, the specific volume decreases to 12.0 ft.$^3$/lb. With a somewhat greater pressure boost of approximately 38" H$_2$O, the specific volume decreases to 11.6 ft.$^3$/lb. In this regard, specific volume is simply the inverse of density and, as such, is roughly inversely proportional to generator capacity.

Figures 6, 7:
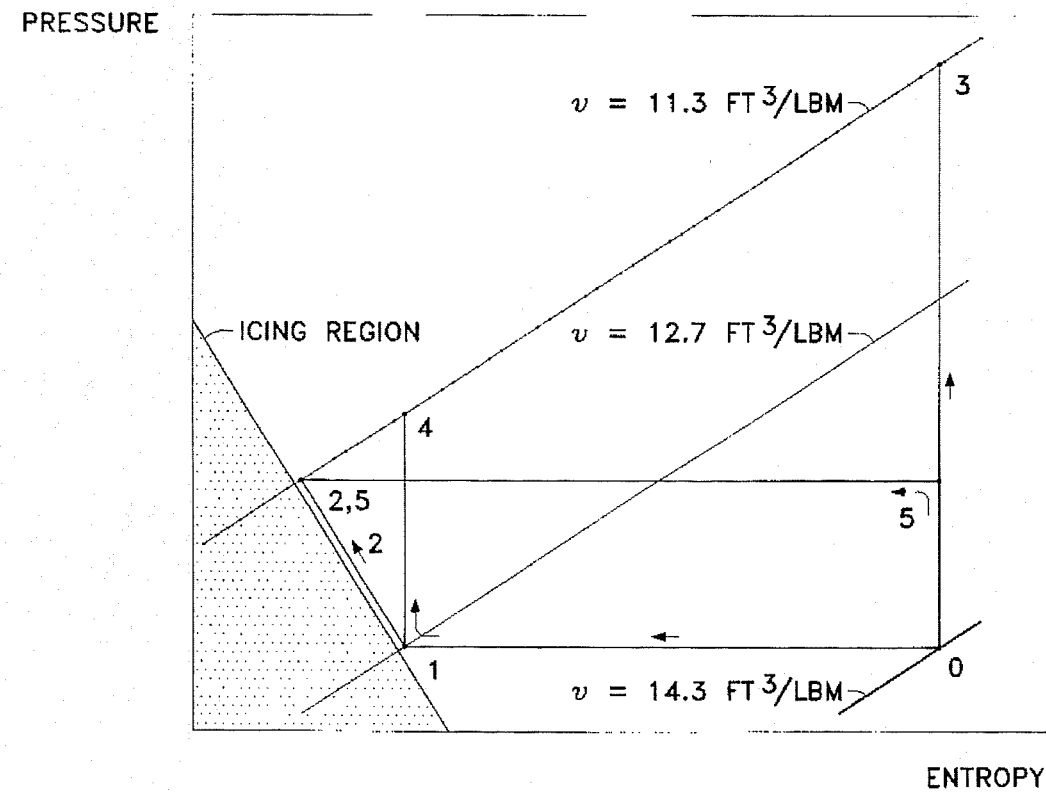
FIG. 6 is a chart showing a summary of results achieved by the present invention (2) versus other approaches.
FIG. 7 is a pressure versus entropy graph showing the region in which the processes referenced in FIG. 6 take place.

FIG. 6 is a chart showing a summary of results achieved by the present invention versus other approaches to treating the inlet air to a gas turbine system. The processes compared in FIG. 6 are theoretical ideals. In reducing these processes to practice, inefficiencies will inevitably arise which increase the work and cooling required to achieve the desired result. The comparison serves to illustrate the relative merit of the various processes rather than actual energy requirements.

The "isobaric cooling" approach of FIG. 6, e.g., cooling to a representative icing limit of 40° F. by evaporative cooling, ice harvesting cooling, etc., results in a final specific volume of 12.7 ft.$^3$/lb.

For purposes of the chart of FIG. 6, the system of the present invention (when utilizing relatively cold treatment water and achieving a significant drag-induced pressure boost) is modeled as a system that first cools the inlet air and then subjects it to isothermal compression. This model is chosen because the mass flow rate of the water droplets through the tower is significantly greater, up to about ten times greater or more, than that necessary solely to cool the inlet air to approximately 40° F. Thus, the inlet air is cooled to 40° F. in the first few feet of its vertical descent through the tower with the remaining descent utilized solely for isothermal compression. It will be noted that the final specific volume is 11.5 ft.$^3$/lb. for cooling to 40° F. and a compression boost of 42" H$_2$O.

The "isentropic compression" approach referred to in FIG. 6 is representative of a compression achieved solely by a supercharger fan or blower. In this instance, the compression must be on the order of 145" H$_2$O to achieve a final specific volume of 11.5 ft.$^3$/lb.

The example of FIG. 6 involving first cooling and then isentropic compression is a theoretical example not known to have been proposed or actually reduced to practice.

The fifth approach of FIG. 6, isentropic compression followed by cooling, represents the process proposed for base load gas turbines in the disclosure of U.S. Pat. No. 3,796,045 which is discussed above in the "Background" portion of this disclosure.

It will be noted that under the columns of FIG. 6 entitled "Ideal Work" and "Ideal Cooling" that the ratio of work to cooling as well as the combined energy requirements varies between processes. By way of distinction, work or "shaft work" is not easily stored and represents a parasitic reduction in the net power output of the combustion turbine. In contrast, cooling energy is easily stored in the form of ice. The ice can be made before it is needed so that power required for cooling does not reduce the net output at the time of peak load. The table in FIG. 6 shows that isothermal compression has the lowest parasitic power requirements of the four options to boost density beyond the level of simple cooling.

FIG. 7 is a pressure versus entropy graph illustrating the processes of FIG. 6. At an inlet condition (0) of 95° F. and 77° F. wet bulb, the specific volume is 14.3 ft.$^3$/lb. The final condition after isobaric cooling (1), isobaric cooling and isothermal compression (2), isentropic compression (3), cooling then isentropic compression (4) and isentropic compression then cooling (5) are also shown. It will be appreciated that given this choice of axes, horizontal displacement represents a heat transfer process while vertical displacement represents a compression process. As was pointed out above, thermal energy is easier to store than mechanical energy required for compression. Thus, processes which are confined to the lower region of the graph are preferred to the more mechanically intensive processes.

It also should be noted that FIG. 7 represents a state diagram. While the process of the present invention (2) and the compression/cooling process (5) produce air at the same state or condition, the process of the present invention uses less energy as is shown in FIG. 6. Energy use is dependent not only on the initial and final states but also on the path between them. The present invention incorporates an isothermal compression path which is inherently more efficient than isentropic compression.

Inlet Air Treatment System Designs

The description will now turn to a discussion of several illustrative inlet air treatment system designs that incorporate the above-described features of the invention, taking into account the relevant thermodynamic principles.

One straightforward design involves the injection of all of the treatment water in the form of relatively uniformly sized drops, with the drops having approximately the same velocity and being uniformly distributed across the cross sectional area of the tower. The initial downward velocity of the water drops may be at or near the terminal velocity of the water drops relative to the co-current flow of inlet air, e.g., in the range of about 75% to about 300% of the terminal velocity. This condition may be achieved by injectors that take the form of an array of nozzles that are uniformly distributed across the tower inlet section and appropriate pump(s) such as are readily available and well known in the art. The injectors may include ring-like members (as shown in FIG. 2) that communicate with the nozzles. This array of nozzles serves to uniformly disperse the treatment water across the entire cross sectional area of the tower so as to reduce the possibility of creating low pressure zones that could result in eddy currents or "blow back" conditions. The nozzles are selected to give the velocities that are needed with the least pressure drop to minimize pumping power requirements.

At an injection velocity substantially equal to the terminal velocity of the water drops relative to the inlet air flow, e.g., about 30 feet per second relative to the air, the velocity of a water drop and its kinetic energy will remain substantially constant during its descent. At an injection velocity below terminal velocity, e.g., 75% terminal velocity, the water drop will actually accelerate during its descent and its kinetic energy will increase. At an injection velocity above terminal velocity, e.g., 150% terminal velocity, the water drop decelerates during descent. With respect to water drop size, in this particular embodiment, a size distribution similar to that of raindrops in a relatively intense downpour may be achieved, i.e., a distribution lying largely between 1 mm and 4 mm drop diameter. The terminal velocities of various drops within this size range will vary; however, the term "terminal velocity" as used herein is meant to refer to the average terminal velocity of the water drops relative to the inlet air flow over the size distribution range.

In the operation of an inlet air treatment system as described immediately above, in order to achieve cooling of 95° F. atmospheric air to 34° F. inlet air with a compression boost of approximately 12" $H_2O$, the following design parameters have been established. The vertical distance from the nozzles at the top of the tower to the water level in pool 60 may be approximately twenty feet. The internal cross-sectional area of the tower is in the range of 0.8 sq. feet per 1,000 cfm inlet air flow. Inlet air is introduced into the tower to produce an average velocity of inlet air within the tower on the order of 20 ft./second. The treatment water at approximately 32° F. to 34° F. is injected at the top of the tower with a downward velocity substantially equal to the terminal velocity of the water in the co-current flow; i.e., at approximately 35–40 ft./second relative to the inlet air flow. For this embodiment, as well as the embodiments discussed below, the ratio of the mass flow rate of the treatment water to the inlet air mass flow rate preferably is in the range from about 5:1 and 150:1, with a more preferred range being from about 20:1 to 50:1, and with the most preferred ratio being on the order of 35:1. It will be appreciated that in this example, and in other examples herein, the inlet air is cooled to temperatures on the order of 33° F. to 34° F., well below the theoretical "icing" limit of certain compressors. However, the icing phenomenon is theoretical and is believed not to present a problem with many compressors. Where there is a problem, the inlet air may be dehumidified in the manner discussed later in this specification or cooled only to the icing limit, e.g., 40° F.

Figure 8:
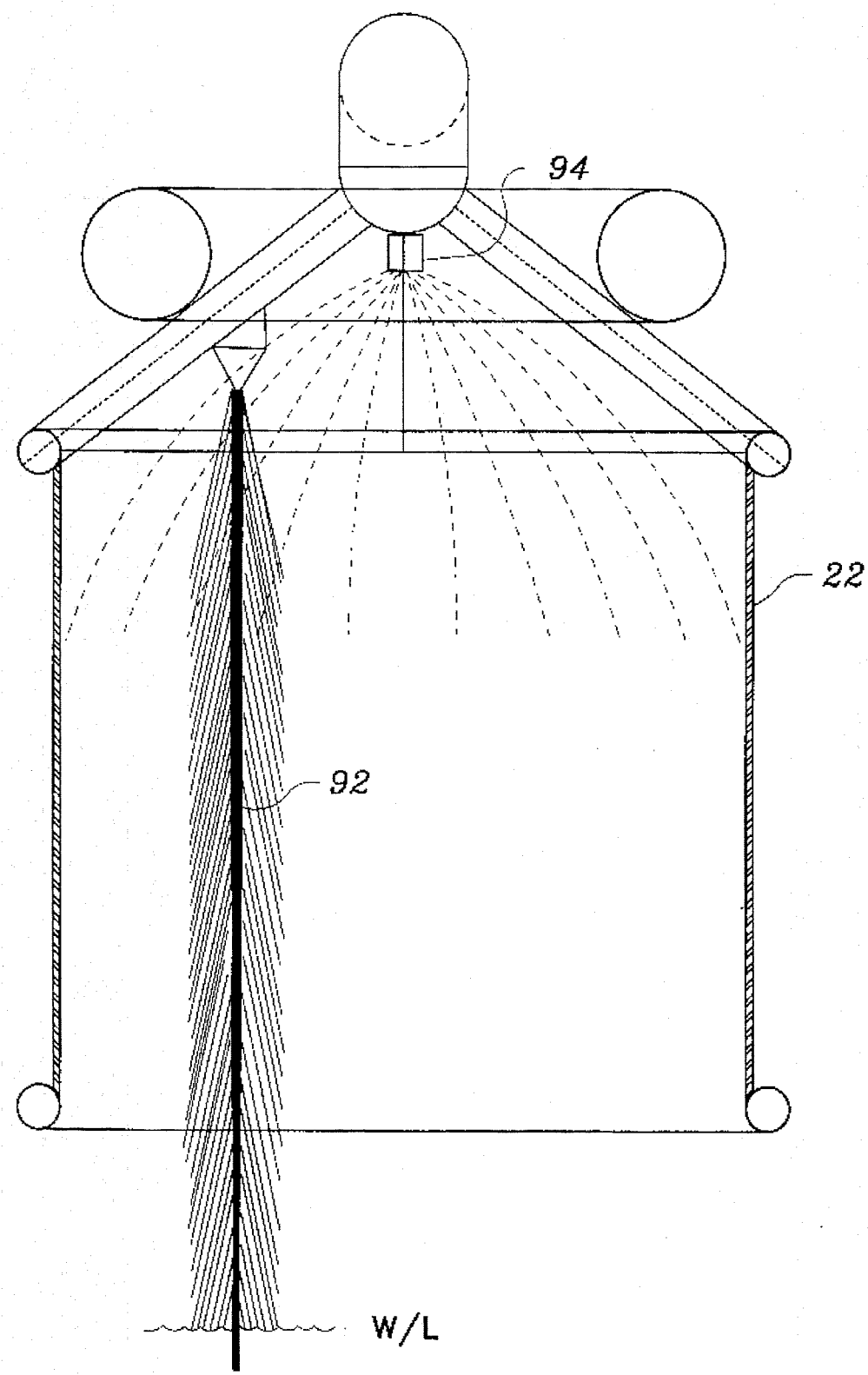
FIG. 8 is a schematic representation of a tower showing a descending treatment water flow pattern wherein some of the water is introduced into the tower in the form of diffused water drops while another portion of the water is introduced as jets having a collimated jet core, with the jets shedding outer layers into droplets throughout their descent in the tower.

Another design approach is an inlet air treatment system that serves to optimize the transfer of kinetic energy from the treatment water to the inlet air in the form of pressure boost while permitting the use of a relatively short tower. Short towers have the advantage of lower construction costs and, more importantly, reducing the parasitic pumping energy that is required to pump treatment water up to the water injectors. Prior to a discussion of particular structures incorporating this design approach (FIGS. 9–11), the water flow characteristics of this and similar systems will first be described with reference to FIG. 8. It has been found that a treatment water injection and flow pattern as shown in FIG. 8 enables the invention to be carried out in a relatively short tower 22 wherein the kinetic energy of the treatment water is dissipated efficiently and relatively uniformly throughout the height of the tower. The flow pattern illustrated in FIG. 8 is created by a water injection system that creates an initial water injection situation where different portions of the water at the top of the tower have different flow characteristics. Some of the treatment water is injected in relatively stable jets 92 that tend to maintain a collimated jet core over a substantial part of the overall descent, while shedding outer layers into droplets uniformly throughout descent in the tower. The remainder of the treatment water is injected in a relatively diffused manner so that it is broken up (or "diffused") at or immediately after its initial introduction into the top of the tower into raindrop sized drops. (Only one jet 92 and one diffused water injection point 94 are shown to facilitate illustration, with it being understood that many such jets and points will typically be used in practice.) Thus, according to this water injection approach, the injected water begins breaking up at different elevations within the tower. Once any portion of the injected treatment water breaks up (or diffuses), it can more easily give up its kinetic energy to the co-currently descending inlet air and, of secondary importance, present a greater surface area per unit volume for direct-contact heat transfer purposes. The above described treatment water flow pattern provides several advantages. First, the flow pattern creates remarkable stability for the inlet air and treatment water throughout their co-current descent. This stability is achieved in part by the stabilizing effect of the portion of the water that remains in a collimated jet core flow pattern to a level near the bottom of the tower. The collimated water pattern tends to serve as a flow stabilizer for the air and portions of the water that break up at higher elevations. This stability of flow helps to establish a consistent, nonfluctuating pressure for the treated inlet air being delivered to the turbine system. The stable flow also reduces the amount of water that impacts the internal walls of the tower. The water that simply flows down the walls in sheets does not materially assist in either heat transfer or drag-induced pressure boost.

A second advantage of the flow pattern of FIG. 8 is that the breaking up of a portion of the treatment water in the first several feet of descent enables the heat transfer to begin immediately. This filling of the first several feet of the tower with relatively small, diffused water drops also serves to prevent "blowback" conditions because these water drops effectively seal the upper portion of the tower against reverse air flow in the tower.

A third advantage of the flow pattern of FIG. 8 is that by having the descending water "break up" at different levels throughout the tower, the work of drag-induced pressure boost is carried out throughout the height of the tower instead of at one localized elevation. This is an advantage because it further stabilizes the pressure gradient in the tower, thus serving to reduce blowback conditions.

The treatment water injection and flow principles discussed immediately above with reference to FIG. 8 have been applied to a relatively small scale inlet air treatment system and may be applied to a similar, but larger scale system used with a full size peaking gas turbine of the type employed in conventional electrical power generation.

Turning first to a description of the smaller scale system, the overall structural configuration is similar to that of system 20 of FIGS. 1 and 2 with the primary exception being the use of a different treatment water injection system—one that is specifically designed to create the descending water flow pattern of FIG. 8. The treatment water injection system, shown in plan view of FIG. 9, includes an array of both diffusion nozzles 150 and jet nozzles 160 supported by a suitable structure (not shown) mounted near the top of the tower. In the illustrated embodiment, the nozzle array includes nineteen 1⅝" diffusion nozzles 150 and seventy-two ¾" jet nozzles 160 within the five foot diameter tower, with nozzles 150 injecting approximately half of the treatment water and nozzles 160 injecting the other half. The nozzles were located approximately twenty-five feet above the water level in the collection pool 60. The key structural and operational parameters of this system are set forth in Table 1, below.

TABLE 1

| | |
|---|---|
| Tower Diameter | 5 feet |
| Tower Cross Sectional Area | 20 square feet |
| Tower Height (Nozzle to Pool Water Level) | 25 feet |
| Inlet Air Velocity at Top of Tower | 21 fps |
| Inlet Air Velocity at Bottom of Tower | 18 fps |
| Inlet Air Flow Rate to Turbine | 25,000 scfm (2100 lbs./min) |
| Treatment Water Flow Rate | 8,600 gpm (72,000 lbs./min) |
| $\dot{m}_{water}:\dot{m}_{air}$ | 34:1 |
| Diffusion Nozzle Flow Rate (19 nozzles) | 4,300 gpm |
| Jet Nozzle Flow Rate (72 nozzles) | 4,300 gpm |
| Treatment Water Velocity from Diffusion Nozzle | 39 fps (18 fps relative to inlet air velocity) |
| Treatment Water Velocity from Jet Nozzle | 35 fps |
| Inlet Air Pressure Boost | 12" $H_2O$ |
| Ambient Dry Bulb | 95° F. |
| Relative Humidity | 52% |
| Barometric Pressure | 29.82" Hg |
| Treatment Water Temperature (Average) | 33° F. |

TABLE 1-continued

| | |
|---|---|
| Inlet Air Exit Temperature | 34° F. |
| Specific Volume of Ambient Air | 14.4 ft³/lbm |
| Specific Volume of Treated Inlet Air | 12.1 ft³/lbm |

Figure 10:
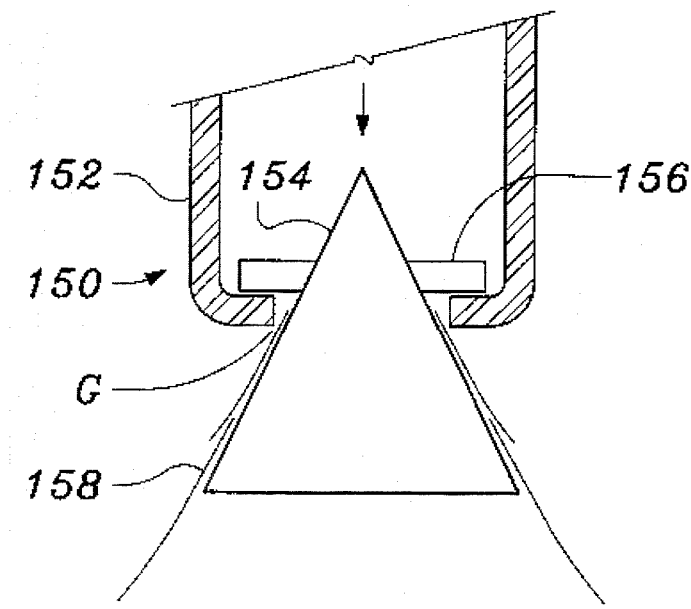
FIG. 10 is a side view of one form of diffusion nozzle.
Figure 11:
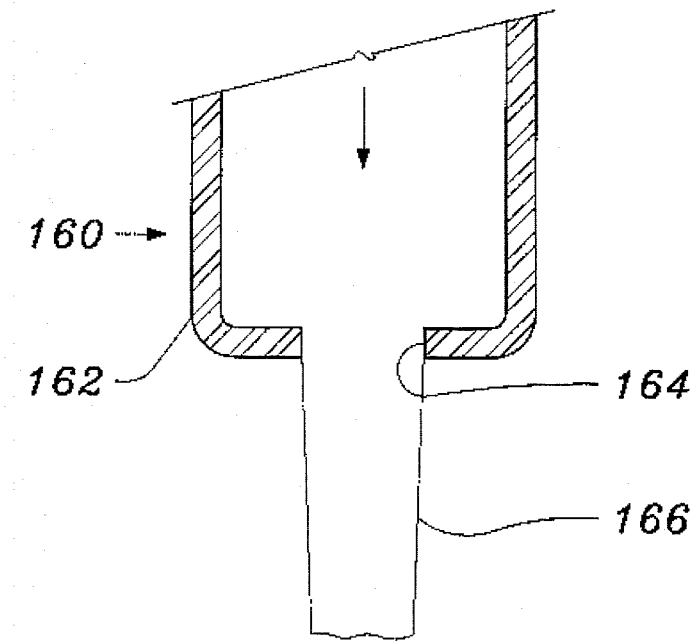
FIG. 11 is a side view of one form of jet nozzle.

As mentioned above, nozzles 150 and 160 create a descending water flow pattern similar to that illustrated in FIG. 8. More particularly, diffusion nozzles 150 cause approximately half of the treatment water to be introduced as relatively small drops, for example raindrop size drops, while jet nozzles 160 form collimated water jets that produce drops evenly throughout the descent through twenty-five foot tower. Illustrative nozzle configurations are shown in FIGS. 10 and 11. Diffusion nozzle 150 includes a cylindrical nozzle body 152 and a conical diffusion member 154 that is secured in position by suitable securement members 156 to created an annular gap G through which the treatment water flows. The treatment water flows downwardly in sheet form along the outer surface of conical member 154 until it flows off of the conical member as at 158. As the water flows along member 154, the thickness of the water sheet or film diminishes, due to the ever increasing diameter of member 154. Thus, by choosing an appropriate length for member 154, the thickness of the water sheet or film exiting member 154 into the air flow may be controlled, with thinner films producing smaller drop sizes as the film breaks up into drops. Jet nozzle 160 includes a conventional nozzle body 162 and mouth 164, producing a jet 166 with a core as illustrated in FIG. 8. It will be appreciated that those skilled in the art may devise alternative designs based upon known principles with respect to the Reynolds number of the flow and related factors.

Other inlet air treatment systems were operated under similar inlet air and treatment water flow conditions to those described immediately above in Table 1, with the exception that the tower height was increased from approximately twenty-five feet to forty-five feet, and then to sixty-five feet. At forty-five feet, the pressure boost was approximately 14" $H_2O$, while at sixty-five feet, the pressure boost was approximately 15" $H_2O$. Thus, a system that was specifically designed to give up most of the available treatment water kinetic energy to the air in a twenty-five foot height, produced only marginal additional pressure boosts when the tower height was almost doubled to forty-five feet, and then tripled to sixty-five feet. The noted increases were due to the utilization of the greater potential energy of the treatment water available in the higher towers, but the results tend to underscore the importance of tailoring the design of the water injection system to tower height, taking into account $\dot{m}_{water}$, $\dot{m}_{air}$ and other variables. In this regard, it will be appreciated that specific injection nozzle designs appropriate to ten foot, thirty foot, forty foot and sixty foot towers can provide appropriate water injection characteristics to different portions of the treatment water so that the treatment water breaks up and releases its kinetic energy to the inlet air at different elevations throughout the height of such towers.

Table 2, below, sets forth the results of five runs of the relatively small-scale inlet air treatment system with twenty-five foot tower height as described above.

TABLE 2

| Treatment Water Flow Rate [GPM] | Inlet Air Flow Rate [scfm] | Inlet Air Velocity [fps] | Inlet Air Pressure Boost ["H$_2$O] | Ambient Dry Bulb [°F.] | Inlet Air Temperature At Exit [°F.] | Treatment Water Temperature [°F.] |
|---|---|---|---|---|---|---|
| 10788 | 33602 | 28 | 10.4 | 74.2 | 41.5 | 40.5 |
| 10783 | 24868 | 21 | 12.3 | 74.2 | 43.2 | 42.4 |
| 10799 | 14901 | 13 | 14.8 | 74.2 | 44.4 | 43.7 |
| 10804 | 9971 | 8 | 15.2 | 74.2 | 45.9 | 45.2 |
| 10820 | 2816 | 2 | 17.1 | 74.2 | 46.3 | 45.6 |

The treatment water flow rates were held substantially constant throughout the five runs, with the primary variable between runs being the air flow rate. Table 2 illustrates, as expected, that higher drag-induced pressure boosts are achieved at lower air flow rates. This is primarily due to the higher relative velocity differential between the air flow and the injected water flow, when the air flow rate is low. However, even at the highest air flow rate of 33,602 scfm, the pressure boost was 10.4" H$_2$O. At the design air flow rate of 24,868 scfm, the pressure boost was 12.3" H$_2$O. With respect to air flow rate and air velocity, it will be noted in Table 1 that the inlet air velocity slows down from 21 fps at the top of the tower to 18 fps at the bottom. This reduction in velocity, due to compression of the inlet air, assists in enhancing the drag-induced pressure boost because of the phenomenon discussed immediately above.

Table 3, below, illustrates the impact of varying water flow rate in connection with a system having a sixty-five foot tower and utilizing the diffusion and jet nozzle configuration described above.

TABLE 3

| Treatment Water Flow Rate [GPM] | Inlet Air Flow Rate [scfm] | Inlet Air Pressure Boost ["H$_2$O] | Ambient Dry Bulb [°F.] | Inlet Air Temperature At Exit [°F.] | Treatment Water Temperature [°F.] |
|---|---|---|---|---|---|
| 7056 | 23326 | 6.4 | 82.3 | 35.7 | 33.3 |
| 8250 | 23568 | 10.2 | 82.3 | 40.2 | 40.0 |
| 9560 | 23431 | 14.3 | 82.3 | 49.4 | 48.5 |

Table 3 shows that at lower treatment water flow rates, the inlet air pressure boost is substantially lower. A first reason is that there is simply less treatment water moving past the inlet air (a lower $\dot{m}_{water}$:$\dot{m}_{air}$ ratio). Furthermore, and perhaps more importantly, the lower treatment water flow rates produce significantly lower treatment water velocities. Since the drag-induced pressure boost is proportional to the square of the treatment water velocity, velocity differentials produce marked differences in inlet air boost. This phenomenon is exemplified by a comparison of runs 1 and 3 in Table 3 where the flow rate (gpm) of run 3 is only 35% greater than that of run 1, while the pressure boost ("H$_2$O) is 123% greater.

Table 4, below, illustrates the relationship between pressure boost and tower height in a situation utilizing 29/32" jet nozzles only.

TABLE 4

| Tower Height [FT] | Treatment Water Flow Rate [GPM] | Inlet Air Flow Rate [scfm] | Inlet Air Pressure Boost ["H$_2$O] | Ambient Dry Bulb [°F.] | Inlet Air Temperature At Exit [°F.] | Treatment Water Temperature [°F.] |
|---|---|---|---|---|---|---|
| 25 | 8070 | 22228 | 0.1 | 77.3 | 51.7 | 51.2 |
| 45 | 8230 | 23843 | 7.6 | 75.1 | 53.2 | 52.8 |
| 65 | 7950 | 22939 | 10.8 | 78.6 | 57.3 | 57.1 |

Table 4 shows that when all of the treatment water is injected by jet nozzles to create stable jets with collimated jet cores, there is very little inlet air pressure boost created in the first twenty-five feet of descent. This occurs because very little of these jets' outer layer is shed to form droplets over the first twenty-five feet. Also, there are insufficient water drops shed in the first twenty-five feet to form a "seal" across the tower; thus, any drag-induced pressure boost that is achieved in the first twenty-five feet is subject to being lost to the ambient atmosphere at the top of the tower via the blowback phenomenon. At forty-five feet of descent, sufficient droplet formation and sealing effect have occurred to create a 7.6" H$_2$O inlet air boost. At sixty-five feet of descent, the pressure boost is measured at 10.8" H$_2$O.

The principles of the present invention, including the treatment water injection principles discussed immediately above in connection with a small-scale implementation, will now be applied to a full scale peaking gas turbine system of the type utilized in commercial production of electrical power. Full scale inlet air treatment system 220 (FIGS. 12 and 13) is designed for use with a Westinghouse 251B combustion turbine (not shown) having an inlet air volumetric flow rate of 264,108 scfm at synchronous speed and ISO conditions. Cooling this air from 95° F. to 35° F. would require on-line refrigeration rated at 3,430 tons when supplied with 30,000 GPM at 33° F. However, with the thermal storage capability as shown in FIG. 2, a 700 ton ice machine operated off peak supplies the required cooling for up to four hours per day operation, five days per week. System 220 includes a tower 222 that may be formed of any suitable material, for example, stainless steel, epoxy-lined steel, cast concrete, or fiberglass. In the particular structure illustrated in FIGS. 12 and 13, tower 222 rests at its base 224 on steel or concrete support columns 226 that are housed within a cylindrical concrete tank structure 230. The base 224 of tower 222 is secured to a one foot O.D. pipe ring 231 that provides a suitable means for securing tower 222 to support columns 226, preferably by vertically disposed bolts (not shown) that extend through pipe ring 231 and into support columns 226. Tank structure 230 has a base 232 and a cylindrical upstanding wall 234 that extends upwardly to a height above the water level (W/L) of pool 260 in the tank. A plenum 240 is formed above pool 260 by cylindrical wall 242 that forms a continuation of the cylindrical upstanding tank wall 234, and a horizontal doughnut-shaped wall 244 that forms the top of the plenum. The air flow into the plenum 240 is the descending treated inlet air from tower 222. This inlet air, represented by arrows Z in FIG. 12, turns to flow substantially horizontally between the support columns 226 and then upwardly through a horizontal doughnut-shaped mist eliminator 248 into upper scroll chamber 250 that is defined at the top by horizontal wall 244, at the bottom by horizontal mist eliminator 248, at the outside periphery by upstanding cylindrical wall 242 and at the inside by the exterior of tower 222. Thus, air enters scroll chamber 250 through mist eliminator 248 and is provided with an exit through duct 280 (FIG. 13) that is formed by vertical wall 282 that is tangential to wall 242 and vertical wall 284 that is tangential the outer wall of tower 222, as well as upper duct wall 286 and a lower duct wall (not shown). Thus, the treated inlet air in scroll chamber 250 is forced into a clockwise flow (arrows Y in FIG. 13) to and into duct 280 which, in turn, leads to the turbine inlet flange.

Appropriate sizing of the above-mentioned inlet air flow paths serves to smooth out the air flow and prevent unnecessary pressure gradients. In this regard, the cross sectional flow area for inlet air flow as it flows between support columns 226 is preferably chosen to match the cross sectional flow area of tower 222, so that the air may flow at approximately the same velocity at this point as it did in the tower. To this end, for use with a sixteen foot diameter tower with a 201 square foot cross sectional flow area, the base 224 of tower 222 is vertically spaced approximately 4.0 feet from the water level of pool 260, to present a flow area between support columns 226 of approximately 201 square feet. Furthermore, it is desirable to have the dimensions of duct 280 correspond to the dimensions of the turbine inlet flange to which the duct delivers the treated inlet air, in this case four feet wide by nine feet high. To achieve this end, scroll chamber 250 is nine feet high from mist eliminator 248 to upper wall 244 and is four feet wide as defined by the radial distance between the outside of tower 222 and wall 242.

Figure 12:
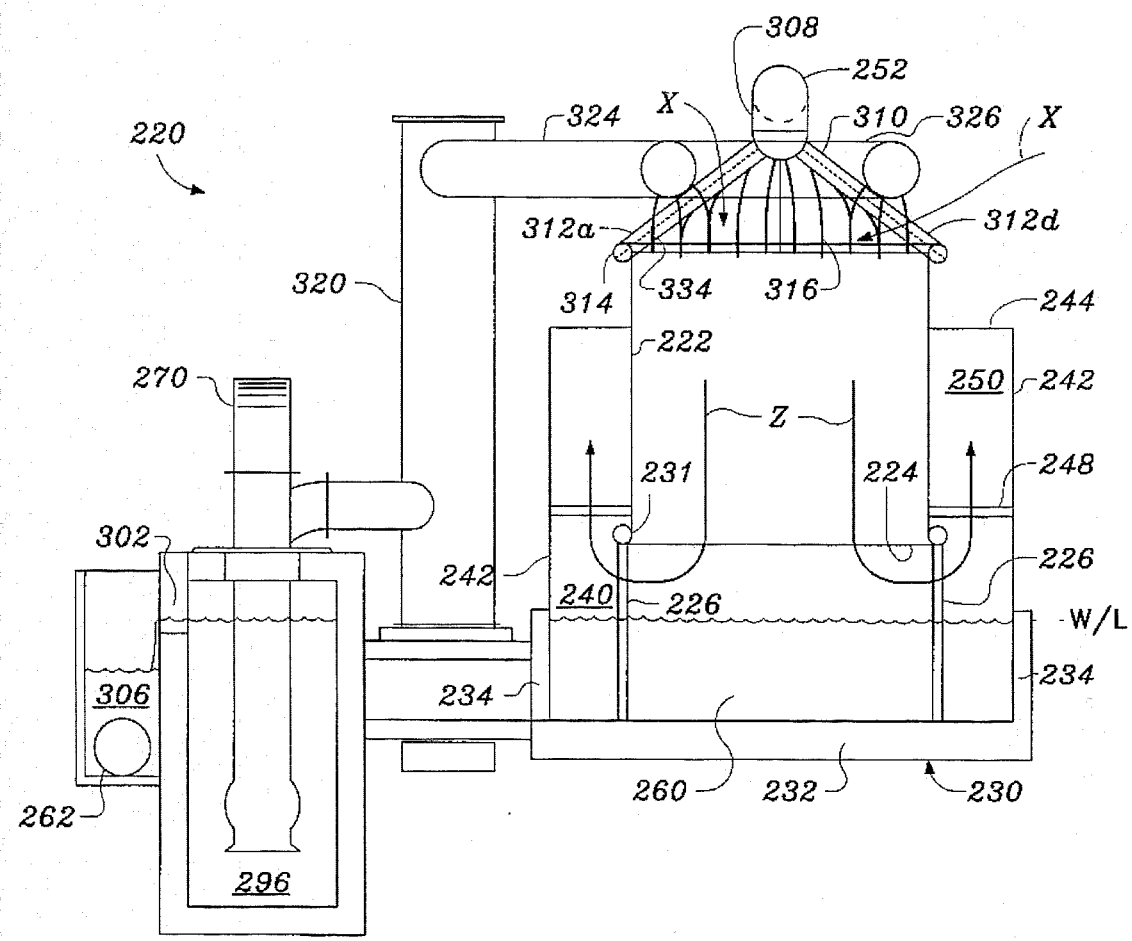
FIG. 12 is a partly schematic side view of portions of a full scale turbine inlet air treatment system.
Figure 13:
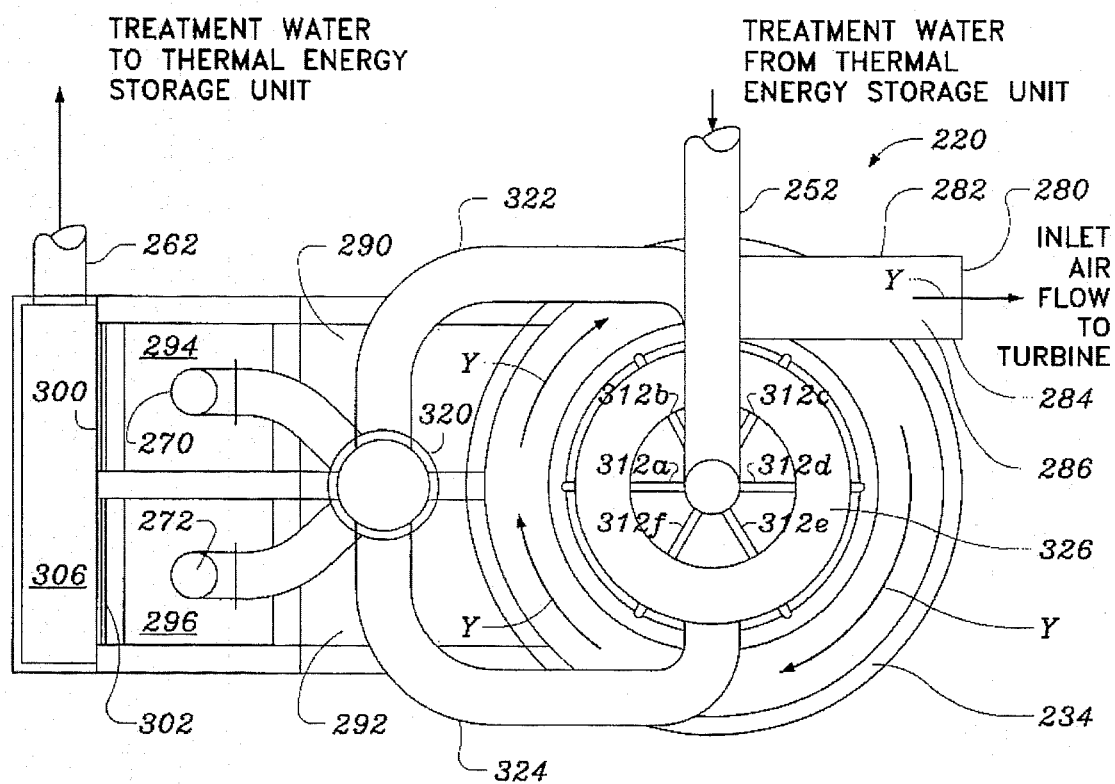
FIG. 13 is a top view of portions of the system illustrated in FIG. 12.

Treatment water supply and return and the treatment water distribution system will now be described with reference to FIGS. 12 and 13. Treatment water may be supplied to the top of tower 222 at a variable rate of 0–90,000 GPM in increments of 30,000 GPM. A first pump (not shown) supplies treatment water directly from the thermal energy storage tank through conduit 252 at 30,000 GPM. A pair of recirculation pumps 270 and 272 supply treatment water to the top of the tower by recirculation from pool 260 below tower 222. Pumps 270 and 272 are each rated at 30,000 GPM. Thus, utilization of all three pumps simultaneously provides 90,000 GPM treatment water to tower 222. A return conduit 262 returns treatment water via gravity to the thermal storage tank at 30,000 GPM. The treatment water flows from the bottom of tower 222 into pool 260, for example at the 90,000 GPM rate discussed above, into a pair of channels 290, 292 that flow to respective pump pits 294, 296. Recirculation pumps 270, 272 are located in the pump pits for recirculating 60,000 GPM to the top of tower 222. The remaining water flow (30,000 GPM) to pits 294, 296 overflows a pair of weirs 300, 302 into a gravity return pit 306 from which water is returned to the thermal storage tank. The height of weirs 300, 302 is adjustable to enable the system to accommodate variations in the water level in pool 260 and pump pits 294, 296. The water level varies in response to the amount of inlet air pressure boost achieved in tower 222, with the water level being depressed more by greater pressure boosts.

Conduit 252 that supplies treatment water from the thermal energy storage tank to the tower may take the form of a thirty-inch pipe that delivers water to the apex 308 of a spider structure 310 defined by six inclined spider pipes 312A–312F located atop tower 222. The spider pipes are supported where co-joined at apex 308 and are further supported at their remote ends by the upper perimetric surface of tower 222. To this end, the upper end of tower 222 is supplied with a circumferential pipe ring 314 that provides a suitable surface for attachment of the ends of spider pipes 312 A–F, as well as lending structural integrity to the tower. Treatment water is delivered to each of the six spider pipes 312A–F at 5,000 GPM. In turn, each spider pipe 312 A–F feeds five six-inch steel delivery pipes 316 (only a few of which are shown in FIG. 12) that are welded thereto and project downwardly where they terminate substantially at the horizontal plane defined by the top of tower 222, with each such delivery pipe 316 delivering 1,000 GPM to a nozzle (not shown).

The recirculating water from pool 260 and pump pits 294, 296 is delivered by the two recirculating pumps 270, 272 via a sixty-inch conduit 320 that splits to two thirty-inch conduits 322, 324 that, in turn, feed into a thirty-inch manifold ring 326 mounted atop tower 222. Manifold ring 326 delivers treatment water to sixty six-inch steel delivery pipes 334 (only a few of which are shown in FIG. 12) that are welded to the manifold ring and terminate substantially at the horizontal plane defined by the top of tower 222. Thus, the above-described treatment water distribution system provides ninety feeder pipes 316, 334 each supplying treatment water at 1,000 GPM to one of ninety nozzles located in the horizontal plane substantially at the top of tower 222.

Figure 9:
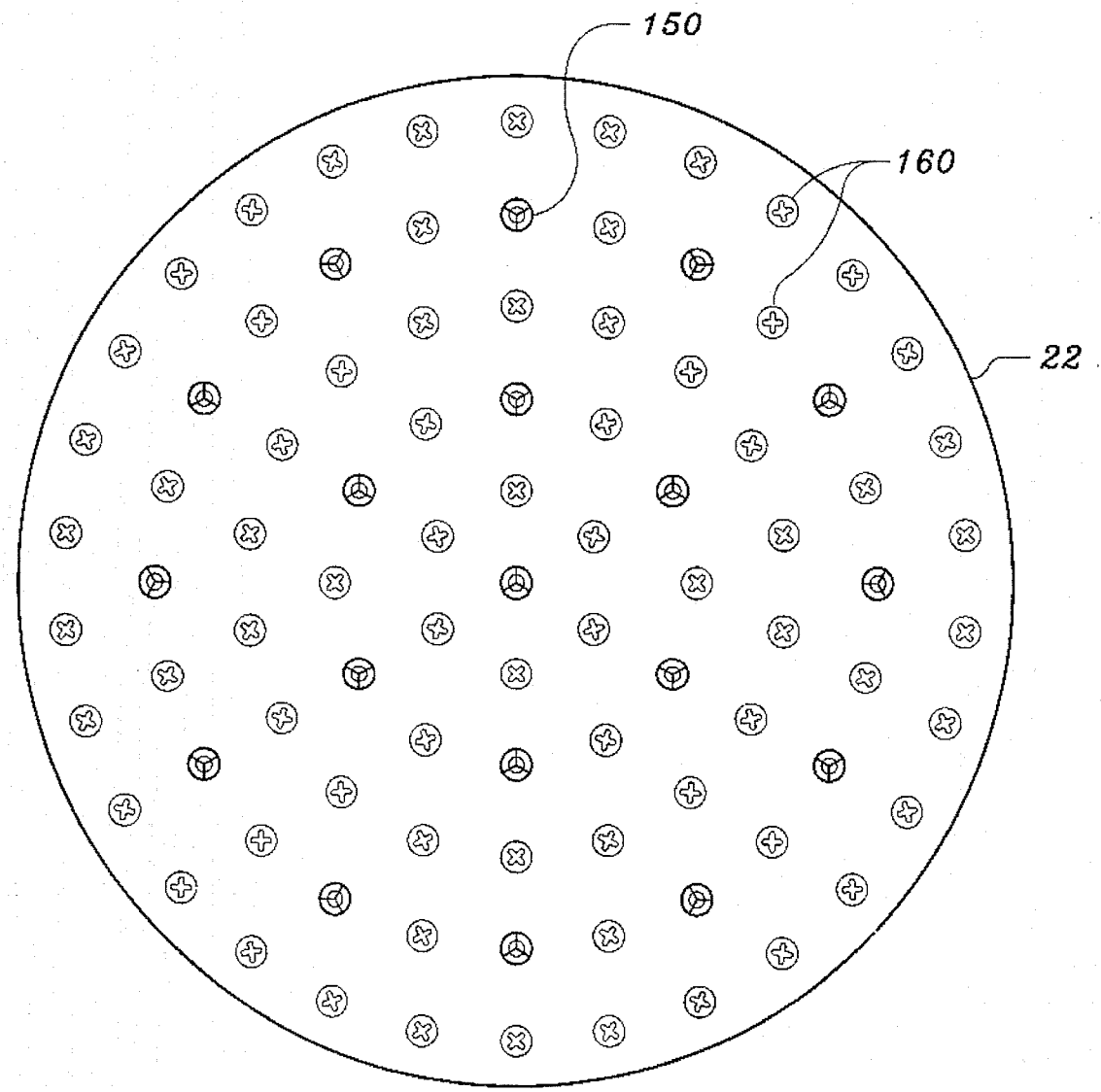
FIG. 9 is a top view of the tower of FIG. 8 showing the array of diffusion nozzles and jet nozzles used to achieve the treatment water flow pattern shown in FIG. 8.

In one manner of practicing the invention, the ninety nozzles are arranged in an array substantially as illustrated in FIG. 9. In this specific embodiment, nineteen diffusion nozzles are utilized in association with seventy-one jet nozzles substantially in the array pattern of FIG. 9. In another embodiment, the thirty nozzles connected to feeder pipes 316 (carrying the cold water directly from thermal storage) are connected to diffusion nozzles while the sixty nozzles connected to feeder pipes 334 (carrying the recirculated treatment water from pool 260) are connected to jet nozzles. These ninety nozzles are arranged in an array that evenly distributes both the diffusion and jet nozzles across the top of the tower. In either embodiment, the diffusion nozzles may take the form of Model No. HHSJ nozzles manufactured by Spraying Systems Co. of Wheaton, Ill., U.S.A. while the jet nozzles may take the form of Model No. F-Fog Jet nozzles manufactured by the same company. Other nozzle configurations that deliver the water in a suitable flow pattern, e.g., the nozzles shown in FIG. 10 and 11, may be used. In this regard, those skilled in the art of fluid dynamics may choose appropriate nozzle designs to achieve the desired flow characteristics described herein utilizing routine experimentation, as well as using mathematical models. In determining a jet nozzle configuration, one may take into account the characteristics of both the water boundary layer and the air boundary layer at the interface between the water jet and inlet air, the turbulence of the inlet air and water jet, the characteristic dimension of the nozzle and associated water jet and the desired relative velocity between the inlet air and water jet (and associated Webber number).

In order to facilitate a smooth introduction of inlet air into the top of tower 222, the configuration of manifold ring 326 and its spacing above the top of tower 222 have been chosen to present a surface area through which inlet air may enter tower 222 (see arrows X in FIG. 12) that approximate the 201 square foot cross sectional area of tower 222. By this configuration, the inlet air does not have to change speed as it begins its descent in tower 222, thereby enhancing the stability of air flow in the first few feet of descent at the top of the tower. Furthermore, the rounded surface of pipe ring 314 forms a bellmouth that smooths the flow of inlet air entering tower 222. It also will be appreciated that a conventional bird screen may be advantageously employed at the top of the tower.

Table 5, below, sets forth the key structural and operational parameters of one preferred full scale inlet air treatment system as described above.

TABLE 5

| | |
|---|---|
| Tower Diameter | 16 feet |
| Tower Cross Sectional Area | 201 square feet |
| Tower Height (Nozzle to Pool Water Level) | 20 feet |
| Inlet Air Velocity at Top of Tower | 25 fps |
| Inlet Air Velocity at Bottom of Tower | 21 fps |
| Inlet Air Flow Rate to Turbine | 264,108 scfm |
| Treatment Water Flow Rate | 90,000 gpm |
| $m_{water}:m_{air}$ | 40:1 |
| Diffusion Nozzle Flow Rate (30 nozzles) | 30,000 gpm |
| Jet Nozzle Flow Rate (60 nozzles) | 60,000 gpm |
| Treatment Water Velocity from Diffusion Nozzle | 75 fps |
| Treatment Water Velocity from Jet Nozzle | 75 fps |
| Inlet Air Pressure Boost | 12" $H_2O$ |
| Ambient Dry Bulb | 95° F. |
| Relative Humidity | 52% |
| Barometric Pressure | 29.82" Hg |
| Treatment Water Temperature (Average) | 34° F. |
| Inlet Air Exit Temperature | 35° F. |
| Specific Volume of Ambient Air | 14.4 ft³/lbm |
| Specific Volume of Treated Inlet Air | 12.1 ft³/lbm |

It will be appreciated that the pressure boosts typically achieved by the present invention are a significant fraction of an atmosphere, e.g., 12" $H_2O$; however, operation of systems producing more modest boosts that are substantially less than those set forth in the examples herein will also fall within the scope of the invention. In this regard, inlet air cooling achieved by hydronic coils, cross current heat exchangers and other heat transfer systems typically involve a penalty of a pressure decrease on the order of 1" to 2" $H_2O$. Thus, even a modest boost achieved according to the principles of the present invention is a marked improvement over the prior art technology.

Figure 14:
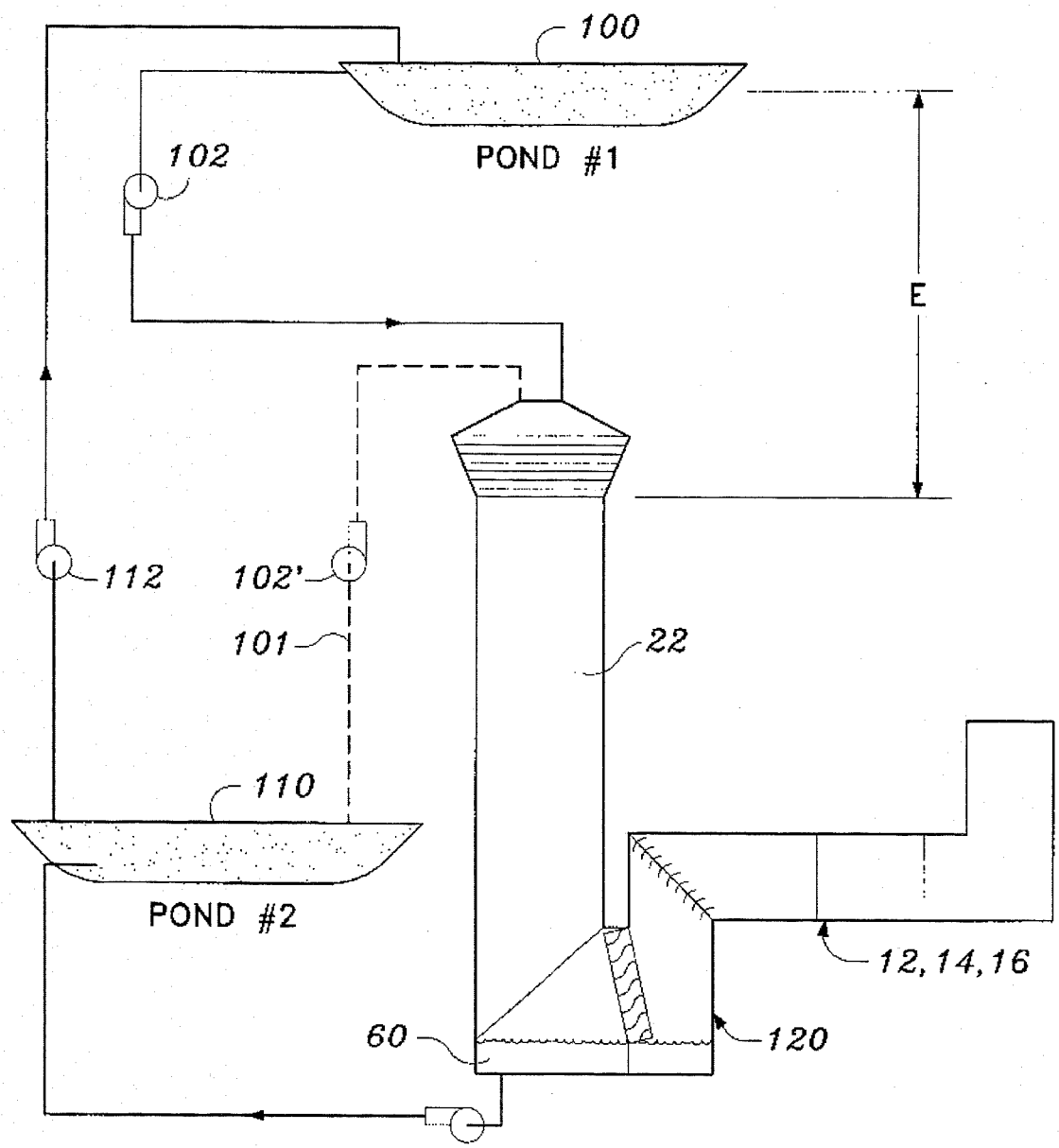
FIG. 14 is a schematic representation of a system of the invention wherein the treatment water is stored in a pond.

FIG. 14 schematically illustrates an alternative embodiment of the present invention constructed in a similar fashion to the embodiment of FIGS. 1 and 2 except that the system for delivery and recovery of the treatment water has been modified. This embodiment incorporates a first treatment water holding pond 100, e.g., a naturally occurring body of water, which serves as the source of treatment water. Pond 100 is located at an elevation above the point of introduction of the treatment water into tower 22, i.e., above the water injector. Treatment water is delivered from pond 100 to tower 22 by pump 102 during those periods when the turbine inlet air is being treated in a co-current flow in the towers. The elevation of pond 100 decreases the power requirements of the pumps, resulting in a reduction in the amount of parasitic, real time power consumption. A second water pond 110 is located at a lower level, for example at the same level as the base of tower 22. Second pond 110 serves to receive the discharge of treatment water from pool 60 during or after operation of the system. At off-peak, low power demand times, the discharge water in pond 110 is pumped by pump 112 to elevated pond 100 where it is reused as treatment water in later cycles. During operation of this embodiment, the treatment water may be delivered to tower 22 at temperatures determined by the water temperature maintained in the pond. If pond 100 is exposed to atmospheric conditions in the summer months in a relatively hot climate, during the 12:00–4:00 p.m. time period the treatment water may be in the range of 70° F. to 75° F. Thus, use of this treatment water will serve to not only compress the inlet air, but also to cool the inlet air to approximately 70° F. to 75° F. If further cooling of the inlet air is desired, it may be achieved by a secondary cooling system located at 120 between the point where the inlet air exits from the co-current flow in tower 22 and its entry into the compressor. The secondary cooling system may take any convenient form, including a system utilizing cold water from an ice harvesting thermal storage system and an appropriate heat exchanger.

With continued reference to FIG. 14, a further alternative system will be described wherein a single pond is used. In this embodiment, the treatment water supply is pond 110 which delivers water to the top of tower 222 via conduit 101 and pump 102' both shown in dashed lines. In a very hot climate where daytime high temperatures reach as much as 100° F. to 105° F. the water in pond 110 may be maintained at approximately 75° F. to 80° F. by evaporative cooling at night. The evaporative cooling may be facilitated by the use of aeration equipment operating during hours of nighttime low wet bulb temperatures. With this system, at 102° F. ambient air conditions, the inlet air may be cooled to approximately 75°–80°, while also supplying a drag-induced pressure boost as desired. With a pressure boost of 9" $H_2O$, the turbine may operate with an inlet air density corresponding to 68° F. ambient conditions. This situation is particularly advantageous for aeroderivative gas turbines where ISO conditions represent maximum volumetric throughput.

Other Features of the Invention

In addition to allowing system designers substantial latitude in selecting final operational parameters, the present invention offers other improvements in the operation of the turbine(s) to which it is attached. For example, the invention facilitates fast starting of a peaking turbine system due to an additional parameter, i.e., inlet air temperature, for controlling gas path temperatures. The rate at which a combustion turbine can be brought to rated load is limited by the rate of increase in temperature at various places in the gas path. By supplying combustion air at a lower temperature, gas path temperatures can easily be maintained below the critical limit.

Another significant aspect of the invention relates to the provision of greatly enhanced capabilities for "load following" to the control center of an electric utility that has installed equipment to practice the present invention. By way of background, electric utilities increasingly participate in power pools that have immense grids from which the utility will routinely supply or receive power as demand varies throughout the grid. The control center(s) of the utility monitors the utility's outflow and inflow of power to/from the grid and seeks to maintain the net outflow/inflow near a desired value, often zero, as measured over a prescribed period of time, for example, fifteen minutes. In order to participate in the power pool, the utility must meet reserve capacity requirements under which the utility must be able to bring a prescribed amount of additional capacity on-line rapidly, for example, within ten minutes of notification. This reserve capacity requirement often is met by the utility having a number of fast-starting, peaking gas turbines available. During the day, particularly at peak demand periods, the control center of the utility must decide when and how many peaking turbines to dispatch and at what percentage of capacity to run the turbine(s) when they are called upon to commit to the grid balancing effort. The above described procedure permits the control center to rapidly modulate the utility's power generation to keep in output/input balance with the grid. Thus, the control center is continuously monitoring the overall load being experienced by the utility (or some portion of the utility) and adding or deleting power from the mentioned peaking turbines. This procedure is referred to as load following.

As an example of load following, assume a 10,000 MW system connected to a grid and being modulated by a number of rapid start peaking gas turbines, for example, Westinghouse #251 turbines that can come up within ten minutes. The #251 turbines, on a hot summer day, have a maximum output of 21 MW. With the cooling and compression boost capability for the turbine's inlet air as provided by the present invention, the maximum output of the #251 turbine can be increased to say, 35 MW (while also enhancing the fast starting capabilities as mentioned above).

A first advantage of the present invention in this situation is that the utility needs fewer #251 turbines on-hand to modulate the system output, resulting in a savings in capital costs. Beyond this savings, moreover, there are significant day-to-day operational advantages achieved by use of the present invention with these turbines. First, the "turn down ratio" of the turbines is increased. Turn down ratio is the ratio of the maximum output of a fast starting turbine to the lowest output at which the system can reliably operate. In the case of the #251 turbines, the lowest output that can be achieved is approximately 5 MW. Thus, the turn down ratio without use of the present invention is 21 MW:5 MW=4.2, while with the present invention installed it is 35 MW:5 MW=7. The control center can more effectively modulate power output when the fast starting turbines have a wider usable band (35 MW–5 MW=30 MW) versus a smaller band (21 MW–5 MW=16 MW).

Another advantage to the load following function is that the invention enables the fast starting peaking turbines to operate more efficiently when they are used at less than full capacity. Without use of the invention, the only way to reduce the output of one of the turbines is to throttle down, which changes the firing temperature in the turbine, thereby reducing efficiency. In fact, a #251 turbine operating in the 5 MW to 10 MW range is operating at a very low efficiency compared to operation at a 21 MW output. This is doubly important when one considers that they are normally running on a premium priced fuel of natural gas or fuel oil. On the other hand, with the wider band provided by the present invention, the modulation of the turbine can be accomplished by modulating inlet air density through control of inlet air temperature and/or drag-induced inlet air compression, thus permitting the turbine to be operated largely at high outputs where efficiencies are good.

One additional aspect of the present invention is that it gives the control center the opportunity to better utilize the ice inventory in the thermal storage tank. As an example, in those hot summer periods when the control center may find it advisable to stretch the ice inventory, a relatively warmer treatment water may be used at a relatively higher mass flow rate to emphasize the drag-induced compression component of the inlet air density boost and de-emphasize the cooling component. Stated differently, the present invention provides the control center with the capability of modulating the increased band segment (i.e., above 21 MW in the above example) with a choice of two variables that increase air density, resulting in a tradeoff being made at all times between depletion of ice inventory versus pumping power for treatment water.

It should be pointed out herein that the theoretical lower temperature limit for the turbine inlet air that can be achieved by inlet air cooling—the so-called "icing limit" that may be on the order of approximately 40° F. for certain turbines—is a result of the introduction of saturated or near-saturated inlet air to the compressor. As described in detail in commonly assigned U.S. patent application Ser. No. 08/100,749, filed Jul. 30, 1993, the contents of which are incorporated herein by reference, the theoretical icing limit may be removed as a lower limit for the turbine inlet air by sufficiently dehumidifying the inlet air before it reaches the compressor. This dehumidifying may be achieved by an aerodynamic dehumidifier 100 (FIG. 2) that is placed in the duct connecting tower 22 to the compressor, or alternatively, at the base of tower 22 in the chamber where the treatment water is separated from the inlet air. Thus, the principles of the present invention, coupled with dehumidifying the inlet air prior to its introduction into the compressor as described in co-pending application Ser. No. 08/100,749, offer the potential to cool the inlet air to temperatures just above freezing, thereby making maximum use of the cooling potential of an ice thermal storage system, while also providing a desired amount of additional density boost to the inlet air by drag-induced compression.

It will be appreciated that the temperature of the treatment water may vary according to the source of the treatment water and the objectives of the control center at any given time. In a broad sense, the temperature of the treatment water will typically reside in the range from about 32° F. to 80° F. When maximum or near-maximum inlet air cooling air is contemplated, the treatment water may be in the range from about 32° F. to 50° F.

It will be understood that the invention's capacity boost to peaking combustion turbines is largely used in summertime hot weather conditions to help meet peak demand; however, there are occasions in the fall and spring when electric utilities shut down substantial portions of their base load generating equipment for maintenance. On these occasions a surge in demand due to a heat wave or cold snap may put a heavy load on the peaking turbines that may be alleviated by use of the present invention.

While the present invention has been described in connection with certain illustrated embodiments, it will be appreciated that modifications may be made without departing from the true spirit and scope of the invention. For example, in order to facilitate the descent of treatment water in the towers, a supplemental system may be employed to provide sheets of water flowing down the interior tower walls. These sheets of water serve to increase the air velocity at the boundary layer, reduce separation at the boundary and thereby enhance the air flow. This and other modifications are within the true scope of the invention as defined by the appended claims.

That which is claimed is:

1. A method of increasing the operational capacity and efficiency of a combustion turbine system having a compressor, combustor and turbine generator by treatment of the inlet air prior to its introduction into the compressor, said method comprising the steps of:

establishing a vertically descending flow of inlet air;

introducing treatment water into the flow of inlet air at a downward velocity greater than that of the inlet air to create a drag-induced pressure increase in the inlet air; and introducing the treated turbine inlet air into the compressor of the turbine system.

2. The method of claim 1 including the step of carrying out the treatment of the turbine inlet air in a tower structure.

3. The method of claim 2 including the step of injecting the treatment water into the tower structure with water flow characteristics establishing a substantially uniform distribution of treatment water flow in droplet form across the interior cross-sectional area of the tower.

4. The method of claim 2 including the step of injecting the treatment water into the tower structure with a descending treatment water flow pattern wherein some of the treatment water is introduced into the tower in the form of diffused water drops while another portion is introduced as jets having a collimated jet core, with the jets shedding outer layers thereof into droplets throughout their descent.

5. The method of claim 1 wherein the treatment water is introduced into the inlet air flow at a temperature in the range of about 32° F. to 80° F. and at a mass flow rate with respect to the inlet air in the range of about 5:1 to 150:1.

6. The method of claim 1 including the steps of utilizing an ice-based thermal storage system as the source of treatment water, making the ice for the ice-based thermal storage system predominantly during off-peak hours and introducing the treatment water into the co-current flow of inlet air and treatment water at a temperature in the range of about 32° F. to 50° F.

7. The method of claim 1 including the steps of utilizing an ice harvesting thermal storage system as the primary source of treatment water, making the ice for the ice harvesting thermal storage system predominantly during off-peak hours and, prior to injection of treatment water into the co-current flow, utilizing a closed-loop system with feedback for mixing secondary water with the primary treatment water to provide injected treatment water at a desired temperature.

8. The method of claim 1 including the steps of utilizing a water pond as the source of treatment water and introducing the treatment water into the inlet air flow at a temperature substantially determined by the water temperature maintained in the pond.

9. The method of claim 8 including the step of cooling the inlet air by a secondary cooling system between its exit from the co-current flow and its entry into the combustion turbine system.

10. The method of claim 8 including the step of utilizing a water pond located at an elevation above the point of introduction of the treatment water into the co-current flow.

11. The method of claim 10 including the steps of utilizing a second water pond to receive the treatment water after its discharge from the co-current flow, and pumping water upwardly from the second pond to the first-mentioned water pond during off-peak power demand periods, thereby minimizing the amount of parasitic, real-time power consumption necessary to supply the treatment water to the inlet air flow.

12. The method of claim 1 including the step of increasing the rate at which the combustion turbine system is brought to rated load by utilizing the inlet air treating step prior to start-up of the combustion turbine system.

13. The method of claim 1 including the step of utilizing the inlet air treating step during periods when significant base load generating capacity of an electric utility is out of service.

14. The method of claim 1 wherein the inlet air and treatment water flow downwardly together for about five to seventy feet.

15. The method of claim 1 including the steps of treating the inlet air during ambient weather conditions above 80° F. and utilizing treatment water at a temperature in the range from about 32° F. to 50° F.

16. A method of increasing the operational capacity and efficiency of a peaking gas turbine system having a compressor, combustor and turbine generator operating in ambient weather conditions over about 80° F. by both cooling and compressing the inlet air to increase its density prior to its introduction into the compressor, said method comprising the steps of:

in a columnar tower structure, establishing a vertically descending flow of turbine inlet air from the atmosphere;

injecting treatment water into the flow of inlet air at a temperature in the range of about 32° F. to 80° F., at a mass flow rate in the range of about 5:1 to 150:1 with respect to the inlet air and with a downward velocity greater than that of the inlet air, and thereby cooling the inlet air to a temperature close to that of the treatment water and creating a drag-induced pressure increase in the inlet air.

17. The method of claim 16 including the steps of injecting the treatment water with flow characteristics causing some of the treatment water to be diffused into droplet form across the tower within the first portion of treatment water descent to enhance quick cooling of the inlet air in the first portion of treatment water decent and to create a seal to prevent blow back, while injecting the remainder of the treatment water in the form of jets that diffuse into water droplets throughout the co-current descent with the inlet air.

18. The method of claim 16 including the steps of collecting the treatment water in a pool at the base of the tower and reusing at least a portion Of the water in the pool as injected treatment water.

19. The method of claim 16 wherein the ratio of mass flow rate of treatment water to mass flow rate of inlet air is in the range of about 20:1 to 50:1.

20. The method of claim 16 wherein the ratio of mass flow rate of treatment water to mass flow rate of inlet air is on the order of 35:1.

21. The method of claim 16 wherein the average downward velocity of the treatment water at the part of injection is in the range of about 75% to 300% of the terminal velocity of the water relative to the inlet air flow.

22. The method of claim 16 wherein the inlet air and treatment water flow co-currently for about five to seventy feet.

23. The method of claim 16 wherein the inlet air and treatment water flow co-currently for about ten to forty-five feet.

24. A method of increasing the operational capacity and efficiency of a combustion turbine system having a compressor, combustor and turbine generator by both cooling and compressing the inlet air to increase its density prior to its introduction into the compressor, said method being characterized by the utilization of multiple operational parameters that may be controlled and adjusted to achieve the desired increase in inlet air density, said method comprising the steps of:

in a columnar tower structure, establishing a vertically descending flow of turbine inlet air from the atmosphere at a known mass flow rate;

injecting treatment water at a known mass flow rate, known temperature and with predetermined flow characteristics into the flow of inlet air at a downward velocity greater than that of the inlet air; and controlling (i) the ratio of the mass flow rate of the treatment water to the mass flow rate of the inlet air, (ii) the temperature of the treatment water to a desired temperature below that of the ambient atmosphere, and (iii) the flow characteristics of the injected treatment water, to thereby cool the inlet air to substantially the temperature of the treatment water and to impart a drag-induced pressure boost to the inlet air determined by the mass flow rate and flow characteristics of the treatment water.

25. A method of enhancing the load following capabilities of an electric utility having a base load generating capacity and also having peaking combustion turbine systems available for rapid deployment to modulate the utility's power generation level to match the level required by a power pool or like arrangement, said method comprising the step of expanding the operational capacity and associated turn down ratio of the peaking combustion turbine systems by providing the utility's control center with the capability to increase the density of the inlet air to the compressors of the systems through cooling and compression of the inlet air in amounts and at times determined necessary by the control center, said expanding of the operational capacity and associated turn down ratio being achieved at selected times by treating the turbine inlet air prior to its introduction into the compressor of the turbine system, the method of treating the inlet air comprising the steps of (I) establishing a vertically descending flow of inlet air; (ii) introducing treatment water into the flow of inlet air at a downward velocity greater than that of the inlet air to create a drag-induced pressure increase in the inlet air; and (iii) introducing the treated turbine inlet air into the compressor of the turbine system.

26. The method of claim 25 including the steps of:

cooling the treatment water by utilizing the thermal storage capabilities of a thermal energy storage system of the type having a storage tank maintaining an ice/water mixture and an ice production machine for supplying ice to the tank to maintain a desired ice/water ratio as the ice therein is melted to supply energy for cooling the inlet air;

regulating the ice production forming the ice mass to occur predominantly at off-peak times and at production rates appropriate to maintain sufficient ice in the tank to provide cold treatment water to satisfy the inlet air cooling needs of the turbine; and modulating the power generation of the utility by a combination of inlet air cooling and inlet air drag-induced pressure increase for the peaking combustion turbines to permit a tradeoff between depletion of ice inventory versus pumping power for the treatment water.

27. A tower structure for use in providing a pressure boost to the inlet air for the compressor of a combustion turbine system, said tower structure comprising: a tower defining an interior, vertical air flow passage; an air inlet for introducing atmospheric air into said tower and establishing a vertically descending flow of inlet air in said air flow passage; a water injection system for injecting treatment water into the vertically descending flow of inlet air at a downward velocity greater than that of the inlet air to create a drag-induced pressure boost to the inlet air; and air flow means for introduction of drag-induced pressure boosted air to an inlet of the compressor.

28. The tower structure of claim 27, wherein said water injection system includes diffusion nozzles for dispersing at least a portion of the treatment water in droplet form across substantially the entire cross sectional area of at least the top portion of the tower.

29. The tower structure of claim 28 wherein said water injection system includes jet nozzles for injecting at least a portion of the treatment water in multiple collimated jets.

30. The tower structure of claim 29 wherein said jet nozzles are substantially uniformly distributed across the cross sectional area of the fluid flow passage, and at least a portion of the jet nozzles create treatment water jets that maintain a collimated jet core substantially throughout their descent in the tower to stabilize the co-current flow of inlet air and treatment water, while the water jets also disperse treatment water droplets from their boundary layers throughout their descent to contribute to the drag-induced pressure increase to the inlet air.

31. An inlet air treatment system for increasing the operational capacity and efficiency of a combustion turbine system having a compressor, combustor and turbine generator by treatment of the inlet air to increase its density prior to its introduction into the compressor said inlet air treatment system comprising:

a tower defining an interior, vertical air passage, said tower having an upper end communicating with the atmosphere and a lower end communicating with the inlet of the compressor;

an atmospheric air inlet proximate the upper end of said tower for introducing atmospheric air into the tower for downwardly directed flow therethrough so that the introduced atmospheric air after treatment may serve as the inlet air for the compressor;

a source of treatment water;

water injectors positioned a selected distance above the lower end of said tower for injecting treatment water downwardly into the tower and creating a co-current two-phase flow regime with the descending air in the tower;

means in communication with both the source of treatment water and the water injectors for delivering treatment water to the injectors at a mass flow rate producing a downward velocity for the treatment water exiting the injectors that is greater than the downward velocity of the air in the two-phase flow to create a drag-induced pressure increase in the air as the treatment water and air flow together co-currently; and air flow means communicating with the compressor for directing the treated inlet air to the compressor at a density greater than that of the atmospheric air.

32. The inlet air treatment system of claim 31 including a water collection pool at the base of said tower for collecting the treatment water after its descent through the tower.

33. The inlet air treatment system of claim 32 wherein said air flow means includes a plenum through which the inlet air passes after its descent through the tower.

34. The inlet air treatment system of claim 33 including a mist eliminator between said plenum and the compressor.

35. The inlet air treatment system of claim 34 wherein said tower comprises an upstanding cylinder and said water collection pool establishes a water level a selected distance below the bottom of the tower cylinder, and said system includes an outer cylindrical wall structure spaced outwardly from and concentric with said tower cylinder, said outer wall structure forming a plenum for receiving treated inlet air exiting the tower and forming a scroll chamber for conveying the inlet air to said duct.

36. The inlet air treatment system of claim 32 including means for cooling at least a portion of the water in said pool that is returned to said water injectors.

37. The inlet air treatment system of claim 36 including recirculation means for returning one portion of the water in said pool directly to said water injectors while the remaining portion is routed to said means for cooling.

* * * * *